(12) United States Patent
Plötzeneder et al.

(10) Patent No.: US 12,363,078 B2
(45) Date of Patent: Jul. 15, 2025

(54) SESSION ANONYMIZER

(71) Applicant: Red Bull GmbH, Fuschl am See (AT)

(72) Inventors: Maximilian Plötzeneder, Wals bei Salzburg (AT); Wolfgang Schmirl, Wals bei Salzburg (AT)

(73) Assignee: Red Bull GmbH, Fuschl am See (AT)

( * ) Notice: Subject to any disclaimer, the term of this patent is extended or adjusted under 35 U.S.C. 154(b) by 359 days.

(21) Appl. No.: 18/157,706

(22) Filed: Jan. 20, 2023

(65) Prior Publication Data
US 2023/0328041 A1 Oct. 12, 2023

(30) Foreign Application Priority Data
Apr. 12, 2022 (EP) ..................... 22167889

(51) Int. Cl.
*H04L 9/40* (2022.01)
(52) U.S. Cl.
CPC ................. *H04L 63/0421* (2013.01)
(58) Field of Classification Search
None
See application file for complete search history.

(56) References Cited

U.S. PATENT DOCUMENTS

| | | | |
|---|---|---|---|
| 2007/0266079 A1* | 11/2007 | Criddle | G06Q 10/107 709/203 |
| 2010/0145960 A1 | 6/2010 | Casteel et al. | |
| 2014/0280261 A1* | 9/2014 | Butler | G06F 21/6245 707/756 |
| 2016/0142379 A1* | 5/2016 | Tawakol | H04L 63/0421 726/1 |
| 2019/0303976 A1* | 10/2019 | Wöhle | G06Q 30/0271 |
| 2019/0365333 A1* | 12/2019 | Keen | G16H 40/67 |
| 2021/0026990 A1 | 1/2021 | Gonzalez Sanchez et al. | |
| 2023/0214522 A1* | 7/2023 | Litvin | G06F 7/02 707/692 |

OTHER PUBLICATIONS

Bujlow, T. et al. "Web Tracking: Mechanisms, Implications, and Defenses", arxiv.org Digital Library, Jul. 28, 2015, 29 pgs.
Extended European Search Report for EP Application No. 22167889.9, dated Oct. 7, 22, 8 pgs.
Bujlow, T. et al. "A Survey on Web Tracking: Mechanisms, Implications, and Defenses", Proceedings of the IEEE, vol. 105, No. 8, Aug. 1, 2017, 34 pgs.

\* cited by examiner

*Primary Examiner* — Raqiul A Choudhury
(74) *Attorney, Agent, or Firm* — Seed IP Law Group LLP

(57) ABSTRACT

A computer-implemented method, computer-readable storage medium, and computing system for providing anonymized personally identifiable information includes obtaining a first request including first data indicating actions that happened at a client device and second data that is associated with the first data and is based on personally identifiable information associated with the client device; quarantining at least the second data which at least includes storing at least the second data in a data storage; retrieving data from the data storage, wherein the retrieved data is based on the stored second data; and generating a third request to be transmitted to a server external to the one or more first computers. The third request includes the first data and synthetic data associated with the first data. The synthetic data is based on the retrieved data and was synthesized based on the personally identifiable information.

23 Claims, 9 Drawing Sheets

| Browser/ Operating System | Original User-Agent | Synthetic User-Agent |
|---|---|---|
| Safari /iOS | Mozilla/5.0 (iPhone; CPU iPhone OS 15_1 like Mac OS X) AppleWebKit/605.1.15 (KHTML, like Gecko) Version/15.1 Mobile/15E148 Safari/604.1 | Mozilla/5.0 (iPhone; CPU iPhone OS 15_1 like Mac OS X) AppleWebKit/605.1.15 (KHTML, like Gecko) Version/15.1 Mobile/15E148 Safari/604.1 |
| Safari /iOS | Mozilla/5.0 (iPhone; CPU iPhone OS 15_2_1 like Mac OS X) AppleWebKit/605.1.15 (KHTML, like Gecko) Version/15.2 Mobile/15E148 Safari/604.1 | Mozilla/5.0 (iPhone; CPU iPhone OS 15_1 like Mac OS X) AppleWebkit/605.1.15 (KHTML, like Gecko) Version/15.1 Mobile/15E148 Safari/604.1 |
| Safari /iOS | iPhone XR/iOS-14.8.1/Version: 5.9.1/Build: 3 | Mozilla/5.0 (iPhone; CPU iPhone OS 15_1 like Mac OS X) AppleWebKit/605.1.15 (KHTML, like Gecko) Version/15.1 Mobile/15E148 Safari/604.1 |

Fig. 9

SESSION ANONYMIZER

BACKGROUND

Technical Field

The present disclosure relates to a computer-implemented method for providing anonymized personally identifiable information as well as to a corresponding non-transitory computer-readable storage medium and to a corresponding computing system.

Description of the Related Art

Keeping data secure is a technological challenge affecting a broad spectrum of conventional and new technologies in the age of digitization and big data. In particular, the increasing degree of interconnections and data exchange, such as via the Internet, cause a high demand of keeping personally identifiable information (PII) secure.

This applies especially but not exclusively to web analytics tools that are configured to track, analyze, and report website traffic. In today's world, web analytics tools allow tracking of individual users, storing user data in a database and allowing organizations to analyze single or combined user records to derive findings, such as findings for optimizing user experience. According to conventional technology as illustrated by FIG. 1, a user of a client device 1 is performing actions on a website and as soon as the user submits consent, a third-party analytics tool 1000 hosted on a server in communication with the client device 1 starts tracking the actions of the user. In particular, tracked data, including PII such as IP addresses, is directly sent from the website at the client device 1 to the server 1000 hosting the third-party analytics tool. The user may appreciate the optimized user experience, but also wants to have her or his PII secured.

Conventional attempts to improve data security of PII in context of web analytics tools cut or obfuscate tracked data insufficiently or otherwise allow possibilities to draw conclusions about both the user as well as the client device that has been used to visit the website.

BRIEF SUMMARY

The inventors have recognized that the conventional attempts are insufficient when striving to keep the personally identifiable information (PII) secure. Personally identifiable information directly or indirectly identifies a client device and/or a user of the client device, so that a larger degree of data security is necessary for PII. The PII can, for example, include a session identifier associated with a user of a client device, a portion of an IP address of the client device, a user-agent of a browser used by a user at the client device, a contact address associated with a user of the client device, a name associated with a user of the client device, a browser version and/or other identifiers.

In particular, existing attempts would still allow publishers or third parties to establish a connection between the respective client (e.g., Google Chrome Browser) as well as the web analytics tool (e.g., Google Analytics) by accessing both simultaneously. For example, this may be accomplished through real-time tracking, which shows the application, such as a website or mobile app, a user visits at the client as well as all other corresponding data transmitted to the web analytics tool. In this manner, PII can still be unwantedly accessed.

It is thus an object of the present disclosure to reduce the probability of unauthorized access to personally identifiable information.

This object is achieved by the method as defined by independent claim 1, by the at least one non-transitory computer-readable storage medium as defined by independent claim 22, and by the computing system as defined by independent claim 23. Some of the preferred embodiments are described in the dependent claims, in the description and in the figures.

According to a general aspect of the present disclosure, a method is provided for providing anonymized personally identifiable information, wherein the method is implemented by one or more first computers, the method comprising: obtaining a first request, the first request including first data indicating actions that happened at a client device and second data that is associated with the first data and that is based on personally identifiable information associated with the client device; quarantining at least the second data, wherein the quarantining at least includes storing at least the second data in a data storage; retrieving data from the data storage, wherein the retrieved data is based on the stored second data; and generating a third request to be transmitted to a server external to the one or more first computers, wherein the third request includes the first data and synthetic data associated with the first data, wherein the synthetic data is based on the retrieved data and was synthesized based on the personally identifiable information. The second data may be or include the personally identifiable information or may be the synthetic data that was synthesized based on the personally identifiable information. The data retrieved from the data storage may be the (stored) second data (such as the PII or the synthetic data that was synthesized based on the personally identifiable information before storage as second data in the data storage), or may be the synthetic data that was synthesized based on the personally identifiable information of the stored second data. The synthetic data included in the third request may be the data retrieved from the data storage or may be synthetic data that was synthesized based on personally identifiable information of the retrieved data. The synthetic data may be a generalized, reduced, hashed and/or obfuscated version of the personally identifiable information.

In particular, aspects of the present disclosure place data, being associated with data indicating actions that happened at a client device (tracked data) and being based on PII, into quarantine before making this data available for transmission to an external server, such as a server hosting a web analytics tool or software. Accordingly, the probability of establishing a connection between client (e.g., browser) and external server (e.g., web analytics tool) by accessing both simultaneously is significantly reduced. In particular, real-time tracking, which shows the application, such as a website or mobile app, a user is visiting at the client device as well as all other corresponding data transmitted to the external server (e.g., web analytics software), is significantly hindered. Accordingly, aspects of the present disclosure reduce the probability of unauthorized access to personally identifiable information.

The quarantine may end after expiry of a predetermined amount of time. According to preferred aspects, the retrieved data is retrieved from the data storage, such as for (preparing) transmission of the third request to the external server, or the third request is transmittable to the external server, only after a predetermined amount of time expired since a time when some (e.g., the earliest) of the actions happened at the client device. By involving the quarantine for the data over a predetermined amount of time, the amount of time can be determined such that the above described probability for unauthorized access is further reduced or even minimized to zero. In particularly advantageous aspects of the present disclosure, the predetermined amount of time is in accordance with expiry, or permanent deletion (e.g., on the client device, the first computers, the second computers, or elsewhere outside these devices), of an association of at least a portion of the personally identifiable information with the client device or its user. That is, the amount of time can be determined such that the data that went through the quarantine is only transmitted to the external server (e.g., web analytics software), as soon as or after an or any association between the PII and the user or the client, such as an identifier (e.g., Cookie), expired or was permanently deleted, such as on the client device, on the one or more first computers, on the one or more second computers, or elsewhere outside these devices. That is, upon receipt of the synthetic data, which was synthesized based on the PII, the external server (e.g., the web analytics software), cannot associate the user or the client device with the data received even if the external server was able to reverse-engineer the PII from the received synthetic data. Accordingly, the personally identifiable information can even be kept absolutely secure to a degree even being compliant with General Data Protection Regulations (GDPR). In particular, aspects of the disclosure also allow sending data to any external server hosting any analytics software, irrespective of the location of the external server.

For the above described advantages of the aspects of the present disclosure, it is not essential whether the synthetic data was synthesized based on the PII by an external third party provider or by aspects of the present disclosure. Furthermore, it is not essential for the present disclosure whether the synthetic data was synthesized based on the PII by aspects of the present disclosure before or after the storing of the data in the data storage. In other words, it is not essential whether the data stored in the data storage is already synthetic data that was synthesized based on the PII or if the data stored in the data storage still includes PII that is to be converted into synthesized data after retrieval of the data from the data storage and before transmission to the external server. All these realizations of the data synthesis are compatible with or encompassed by the present disclosure.

According to a preferred aspect of the present disclosure, the data synthesis takes place before the storing of the data in the data storage. In particular, the second data included in the obtained first request and/or the data retrieved from the data storage can be the synthetic data that was synthesized based on the personally identifiable information associated with the client device. In that case, the method can also include: by one or more second computers, receiving a second request directly or indirectly from the client device, wherein the second request includes the first data and the personally identifiable information, and generating the first request based on the second request, wherein the generating of the first request includes synthesizing the synthetic data including converting at least some of the personally identifiable information included in the second request into the synthetic data and including the synthetic data instead of the personally identifiable information into the first request. The one or more second computers can be among the one or more first computers but may be located upstream of the data storage. Alternatively, the one or more second computers can be external to (e.g., upstream to) but communicatively coupled with the one or more first computers, wherein the one or more second computers can include a synthesizer server that is located upstream of the one or more first computers. In any case, the one or more second computers can receive the second request indirectly from the client device by having a distribution server receive the second request from the client device and by having the distribution server forward the second request to the one or more second computers and optionally to one or more further computers. The distribution server (intermediate server) may be located between the client device and the one or more second computers and/or may be communicatively coupled with the client device and the one or more second computers. That is, the second request may be transmitted directly or indirectly from the client device to the one or more second computers.

Having the data synthesis take place before the storing of the data in the data storage, is particularly advantageous in terms of data security, because the data that is stored in the data store and subsequently processed before the transmission to the external server is already freed from some or all of the PII, such that obtaining access to the data is as such not sufficient to establish a relationship of the data with a particular client or user. That is, the anonymization of the PII is performed early and the risk of leaking PII, such as through an attack onto the data storage, is reduced. Also, the synthetic data can be previewed before storing the data in the data storage, which allows to reduce errors when testing the system or when processing the data before transmission to the external server.

According to another preferred aspect of the present disclosure, the data synthesis takes place after the storing of the data in the data storage. In particular, the second data included in the obtained first request and/or the data retrieved from the data storage is the personally identifiable information associated with the client device. The generating of the third request can then also include: synthesizing the synthetic data including converting at least some of the second data or retrieved data into the synthetic data and including the synthetic data instead of the second data or retrieved data into the third request. Having the data synthesis take place after the storing of the data in the data storage, has other advantages. For example, the computing resources needed for the data synthesis may be saved until the data is actually retrieved from the data store for transmission to the external server. Also, load can be taken away from data processing components (e.g., a receiver) upstream the data storage, which will then have improved reaction times and will provide better user experience at the frontend of the system. Further, synthetic data is often larger in size than the original data, so that the amount of required memory in the data storage can be reduced.

According to an aspect of the present disclosure, the quarantining may further include retrieving of the retrieved data or second data from the data storage (e.g., the stored data can be retrieved during the quarantine such as for the synthesizing of the synthetic data) and/or the synthesizing of the synthetic data. The second data may be retrieved from the data storage to synthesize the synthetic data based on the retrieved second data. The synthetic data may then either be stored in the data storage before the synthetic data is retrieved from the data storage (e.g., as retrieved data that is based on the stored second data) and forwarded in the system to be included into the third request to be transmitted to the external server, or the synthetic data is not stored in the data storage but is rather directly forwarded in the system to be included into the third request to be transmitted to the external server.

In any case, the third request is not transmittable to the external server during the quarantining until the quarantining is finished. For example, the data that is based on the stored second data and that is to be retrieved from the data storage, such as for the purpose of (preparing) transmission of the third request to the external server, may not be retrievable during the quarantining until the quarantining is finished. That is, it is also possible that the data that is based on the stored second data and that is to be retrieved from the data storage is only made available for retrieval from the data storage, such as for the purpose of (preparing) transmission of the third request which may be after the synthetic data is synthesized, once or after the quarantining is already finished, i.e., the quarantine already ended. Alternatively, the data that is based on the stored second data and that is to be retrieved from the data storage, such as for the purpose of (preparing) transmission of the third request to the external server, may be retrievable during the quarantining and before the quarantining is finished, but the third request is only made available for transmission to the external server once the quarantining is finished, i.e., the quarantine ended. In other words, as long as the third request is not sent to the external server hosting the third party analytics before the quarantining ends, data can be retrieved from the data storage, such as for the (sole) purpose of synthesizing of the synthetic data, before the quarantine ends. In at least some of these cases, retrieving of the second data or retrieved data from the data storage and/or the synthesizing of the synthetic data from part of the quarantining.

Irrespective of whether the data synthesis takes place before or after the storing of the second data in the data storage, the expiry of the predetermined amount of time, such as the time when the association of at least a portion of the personally identifiable information with the client device or its user (e.g., the identifier, such as a Cookie) expires or is permanently deleted (e.g., on the client device, the first computers, the second computers, or elsewhere outside these devices), can preferably be coordinated with the retrieval of the data from the data storage for the purpose of transmission of the third request to the external server or with the transmission of the third request to the external server. That is, the data may only be retrieved from the data storage for the purpose of transmission of the third request to the external server as soon as or after the expiry of the predetermined amount of time or the third request is only transmitted to the external server as soon as or after the expiry of the predetermined amount of time. Before this lapse or expiry, the corresponding operations (data retrieval from the data storage or transmission of the third request to the external server) are prevented by appropriate means (e.g., locks). The expiry of the predetermined amount of time may coincide with the expiry or the permanent deletion (e.g., on the client device, the first computers, the second computers, or elsewhere outside these devices) of the association of at least a portion of the PII with the client device or its user. The expiry of the predetermined amount of time may coincide with the expiry or the permanent deletion (e.g., at the client device, the first computers, the second computers, or elsewhere outside these devices) of any or an identifier, such as a Cookie, associated with at least a portion of the personally identifiable information.

Aspects of the present disclosure provide one or more of the following advantages. Digital platform providers are enabled to track, modify and store data, which is generated by consumers and/or read from their devices, in a way that personal reference can unlikely be made to an individual or device, thereby achieving improved anonymization of PII. Aspects of the present disclosure are using the possibility of isolating data (quarantine), preferably until the device and/or person using it, can no longer be inferred. In other words, data is not being transmitted to the external server until any sort of association or identifier has been eliminated, which keeps PII secure. In addition, aspects of the present disclosure specify particularly advantageous means for synthesizing synthetic data based on PII for achieving a further enhanced degree of anonymization. In fact aspects of the present disclosure enable full anonymization of PII. Aspects of the present disclosure provide data security measures to ensure to only receive, process and store anonymized personally identifiable information at external servers, which is especially advantageous when using analytics tools on such external servers.

Other advantages will become apparent from the following description and the above summary is not meant to limit the scope of the disclosure.

BRIEF DESCRIPTION OF THE SEVERAL VIEWS OF THE DRAWINGS

Various aspects and embodiments will be described with reference to the following figures. It should be appreciated that the figures are not necessarily drawn to scale. Items appearing in multiple figures are indicated by the same reference number in all the figures in which they appear.

FIG. 9 illustrates a data object according to the disclosure that maps different values for a first piece of personally identifiable information to a same synthesized value.

DETAILED DESCRIPTION

Figure 1:
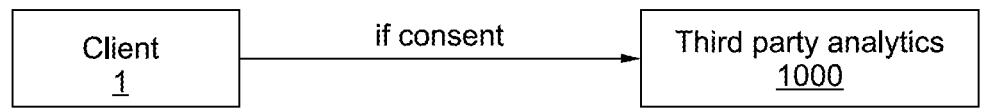
FIG. 1 illustrates a conventional system involving an interaction between a client and a third party analytics according to the prior art.
Figure 2:
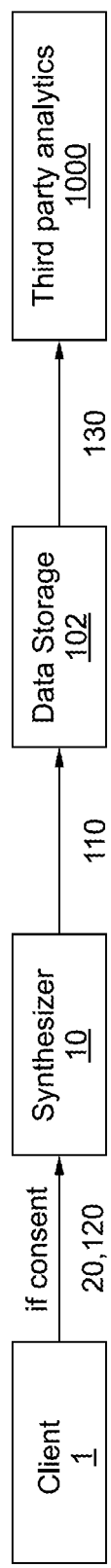
FIG. 2 illustrates a system according to a first embodiment of the present disclosure in which the data synthesis takes place before the data is stored in the data storage.

FIG. 2 illustrates a system according to a first embodiment of the present disclosure in which a data synthesis takes place before the data is stored in the data storage.

A method performed by the system of FIG. 2 relates to providing anonymized personally identifiable information, wherein the method is implemented by one or more first computers of the system (server 100 of FIG. 8), the method comprising: obtaining a first request 110, the first request 110 including first data indicating actions that happened at a client device 1 and second data that is associated with the first data and that is based on personally identifiable information associated with the client device 1; quarantining at least the second data, wherein the quarantining at least includes storing at least the second data in a data storage 102; retrieving data from the data storage 102, wherein the retrieved data is based on the stored second data; and generating a third request 130 to be transmitted to a server 1000 external to the one or more first computers, wherein the third request 130 includes the first data and synthetic data associated with the first data, wherein the synthetic data is based on the retrieved data and was synthesized based on the personally identifiable information. The second data may be or include the personally identifiable information or may be the synthetic data that was synthesized based on the personally identifiable information. The data retrieved from the data storage may be the (stored) second data (such as the PII or the synthetic data that was synthesized based on the personally identifiable information before storage as second data in the data storage), or may be the synthetic data that was synthesized based on the personally identifiable information of the stored second data. The synthetic data included in the third request may be the data retrieved from the data storage or may be synthetic data that was synthesized based on personally identifiable information of the retrieved data.

In general, the synthetic data described herein may be or include a hashed, generalized, reduced and/or obfuscated version of the personally identifiable information.

Obfuscation is the practice of making something difficult to understand or interpret. In the context of data and programming, obfuscation refers to the process of deliberately making code or data difficult to understand or follow, often with the goal of hiding its true meaning or function. In this disclosure, obfuscation is used to hide sensitive parameters such as an email address, name, date of birth, or IP address within a request.

Example

Original value: "John.doe@example.com", or "01.01.2000"
Obfuscated value: "Redacted"

Reduced information represents modified data, in which attributes are removed from the data value. While reducing efforts are used to gain storage capacity, the described invention is utilizing such possibilities also to increase the strength of data privacy mechanisms. In this disclosure, reduction efforts are utilized for information such as the screen resolution, which is reduced in its value, or removed entirely in order ensure that a user or device cannot be identified.

Example

Original Screen Resolution: "1000×1200"
Reduced Screen Resolution: "empty value"

Generalized data refers to information that has been abstracted and simplified to capture only the essential characteristics and to decrease the cardinality of values. In this disclosure, data generalization is utilized to create generic values in order to ensure a higher anonymity amongst users. In this disclosure, generalization is used for information such as the User Agent in order to enforce a specific set of values.

Examples

Original User Agent iPhone (example 1): "iPhone XR/iOS-14.8.1/Version: 5.9.1/Build: 3"
Original User Agent iPhone (example 2): "Mozilla/5.0 (iPhone; CPU iPhone OS 15_2_1 like Mac OS X) AppleWebKit/605.1.15 (KHTML, like Gecko) Version/15.2 Mobile/15E148 Safari/604.1"
Generalized User Agent for all iPhones: "Mozilla/5.0 (iPhone; CPU iPhone OS 15_1 like Mac OS X) AppleWebKit/605.1.15 (KHTML, like Gecko) Version/15.1 Mobile/15E148 Safari/604.1"

Hashed data refers to data that has been processed using a hash function, a mathematical algorithm that converts the data into a fixed-length string of characters. Hashing is used to protect the privacy and security of sensitive information, such as passwords and credit card numbers, by converting the original data into a form that is difficult to reverse or decipher. In this disclosure, a hashing function is applied to information such as the "identifier" utilized to establish the session scope in order to ensure that a device or user cannot be identified once the data has left the quarantine server. In addition to the hashing function, the value can be enhanced with a cryptographic salt to further increase data security.

Example

Original value: "436234240.1670421205836"
Hashed value: "e54e7a30f1065866fe3f2a449390b577a7b6a1681-127ca023ac17d41517a5893-1987"

Apart from obfuscating, reducing, generalizing or hashing, other means to anonymize the personally identifiable information may (alternatively) be used for the synthesizing of the synthetic data in context of this disclosure.

The external server 1000 may be configured to host a third party analytics tool software for analyzing actions that happened at the client device 1.

According to the first embodiment, the second data included in the obtained first request 110 and/or the data retrieved from the data storage 102 is the synthetic data that was synthesized by the synthesizer 10 based on the personally identifiable information associated with the client device 1.

The synthesis of synthetic data may be performed by a synthesizer 10. The synthesizer 10 may be hosted on a third party server external to the system underlying the present disclosure. Alternatively, the synthesizer 10 may be hosted on one or more computers of the system according to the disclosure.

The method performed by the system may optionally further include the operations associated with the data synthesis as performed by the synthesizer 10. The method performed by the system according to the first embodiment may then further comprise: by one or more second computers of the system, receiving a second request 20, 120 directly or indirectly from the client device 1, wherein the second request 20, 120 includes the first data and the personally identifiable information, and generating the first request 110 based on the second request 20, 120, wherein the generating of the first request 110 includes synthesizing the synthetic data including converting at least some of the personally identifiable information included in the second request 20, 120 into the synthetic data and including the synthetic data instead of the personally identifiable information into the first request 110.

The second request 20, 120 may be a first tracking request generated on the client device 1 for tracking of the actions by a user at the client device 1. The one or more second computers can be among the one or more first computers, but may be located upstream of the data storage. Alternatively the one or more second computers of the system can be external to (e.g., upstream to) but communicatively coupled with the one or more first computers, wherein the one or more second computers can include a synthesizer server 10 that is located upstream of the one or more first computers. In any case, the second request 20, 120 may be transmitted directly or indirectly from the client device 1 to the one or more second computers. The one or more second computers can receive the second request indirectly from the client device 1 by having a distribution server (not shown) receive the second request from the client device 1 and by having the distribution server forward the second request to the one or more second computers and optionally to one or more further computers. The distribution server may be located between the client device 1 and the one or more second computers and/or may be communicatively coupled with the client device 1 and the one or more second computers.

Figure 3:
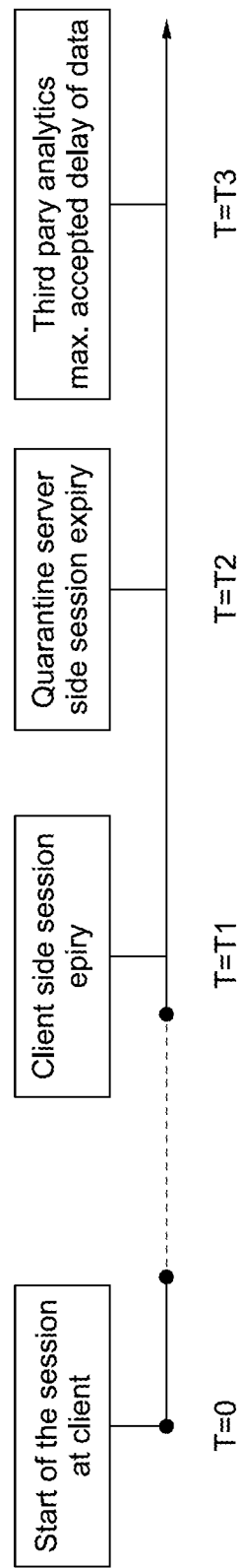
FIG. 3 illustrates a time axis that is equally applicable to the first embodiment and to the second embodiment.

FIG. 3 illustrates a time axis that is equally applicable to the first embodiment and to the below described second embodiment.

Data which is transmitted in real-time could breach with data security and/or legal regulations (GDPR) as a simultaneous check on both the client device as well as the database of the analytics tool could potentially identify a user and/or device. To prevent such an identification, aspects of the present disclosure offer the following approach applicable to each of aspects and embodiments described herein.

Events and data that have been generated on the client 1 are sent from the client 1, such as from the client's browser or apps, to the system of the present disclosure where the data will be temporarily stored in a data store 102 to preferably only be forwarded to the analytics server 1000 once it can be ensured that any identifier is permanently deleted, such as on the client's device 1, on the one or more first computers, on the one or more second computers, or elsewhere outside these devices.

That is, the system of the present disclosure will preferably store all data until identifiers (e.g., cookies) have been eliminated, and only then forwards it the analytics server 1000 (e.g., Google Analytics).

The Client-side session expiration at T1 in FIG. 3 means that the client's device will stop at T1 with producing hits (action data) associated with a specific session ID which are transmitted by the client. The Server-side session expiration at T2 in FIG. 3 means that the system of this disclosure stops accepting new hits at T2 and deems hits ready for dispatching/transmission to the external server 1000. T3 may be a maximum accepted delay of data within the third party analytics before the data is lost and/or T3 may be given by a time in which the external server (analytics tool software) stops accepting new requests or hits attributed to a specific session ID. T1 to T3 are respective time durations after T0.

At T0, the session may be started at the client device 1. In other words, between the time T0 and T1, hits (action data) are produced at the client device 1 by the user performing actions at the client device (e.g., the user clicking on icons of a webpage). At T1, the session ID cookie, or other identifiers or associations between client/user and PII, will expire or deleted at the latest. After T1, no new hits are generated with the same session ID.

At or after T1, such as the latest at T2 that is a certain safety amount of time later than T1, the system of the disclosure may end the quarantine of the collected data. The stored data may not be retrievable from the data storage 102 (e.g., is locked from data retrieval) for the purpose of transmission of the third request to the external server during the quarantine until the stored data is explicitly made available (e.g., the lock is lifted) for the retrieval from the data storage 102, such as for synthetization followed by transmission of the third request 130. Alternatively, the data may be retrievable in the data storage during the quarantine but may not be transmittable to the external server 1000 during the quarantine until the third request is made available for transmission to the external server. For example, it is possible that the data is made available for retrieval from the data storage for the purpose of transmission of the third request, which may be after the synthetic data is synthesized, only when the quarantining is already finished at T1 or T2. Alternatively, the data that is based on the stored second data and that is to be retrieved from the data storage, such as for the purpose of preparing transmission of the third request to the external server, may be retrievable during the quarantining, and before the quarantining is finished at T1 or T2, but the third request is only made available for transmission to the external server once the quarantining is finished at T1 or T2. In other words, as long as the third request 130 is not sent to the external server 1000 hosting the third party analytics before the quarantining ends at T1 or T2, data can be retrieved from the data storage 102, such as for synthesizing of the synthetic data, before the quarantine ends at T1 or T2. In that case, retrieving of the second data from the data storage 102 and/or the synthesizing of the synthetic data can from part of the quarantining.

For example, the retrieved data is retrieved from the data storage 102, or the third request 130 is transmittable to the external server 1000, only after a predetermined amount of time T1 or T2 expired since a time T0 when some (e.g., the earliest) of the actions happened at the client device 1. The first data (action data) is associated with a time stamp and wherein the one or more first computers have access to a clock to determine the expiry of the predetermined amount of time (T1 or T2).

For example, the second data is retrieved from the data storage 102 for transmission of the third request to the external server, or the third request 130 is transmittable to the external server 1000, only at T1 or T2 when an association of at least a portion of the personally identifiable information with the client device 1 or its user expired or was permanently deleted (e.g., on the client device 1, the first computers, the second computers, or elsewhere outside these devices). The association of the portion of the personally identifiable information with the client device 1 or its user expired or was permanently deleted (e.g., on the client device, the first computers, the second computers, or elsewhere outside these devices) by having a computer program, such as an app, change, e.g., at the client device 1, a value of the portion of the personally identifiable information to a new value.

The second data may be stored in the data storage 102 in association with a timestamp that is associated with the actions that happened at the client device 1, wherein a time at which the association or the identifier expired or was permanently deleted on the client device, the first computers, the second computers, or elsewhere outside these devices is determined based on the time stamp. The timestamp may indicate a time T0 when the association of the at least a portion of the personally identifiable information with the client device 1 (or its user), such as the identifier, started and wherein the one or more first computers have access to a clock such that the time (T1 or T2) at which the association or the identifier expired or was permanently deleted on the client device, the first computers, the second computers, or elsewhere outside these devices is further determined based on a read-out of the clock.

For example, the second data is retrieved from the data storage 102, or the third request 130 is transmittable to the external server 1000, only at T1 or T2 when any or an identifier, such as a Cookie, associated with at least a portion of the personally identifiable information expired or was permanently deleted on the client device, the first computers, the second computers, or elsewhere outside these devices.

As further described below in context of FIG. 8, the delay of T2 with respect to T1 may be given by the latency of system components and/or represents a temporal buffer that is preferred to guarantee that the client has clean up the identifier (e.g., the browser at the client has cleaned up the cookie: Cookie expired or was deleted on the client device 1) before any communication with the external server 1000 takes place.

All hits, which are attributed to a specific session, are assigned with a timestamp of the session expiry (moment when identifier, such as cookie, expired or was deleted). This may be implemented to be at or before T2, i.e., a bit later than T1, after the cookie is deleted or expired. In a moment of deletion or expiry, the system will be notified that the session has ended and will then take this notification and enable transmission of the hits associated with the session to the external server 1000.

According to preferred aspects of the present disclosure, the method performed by the system of the present disclosure may further include transmitting the generated third request 130 to the external server 1000, preferably wherein the third request 130 does not include the personally identifiable information. The third request 130 may be transmitted to the external server 1000 only after the predetermined amount of time T1 or T2 expired. For example, the third request 130 may be transmitted to the external server 1000 only as soon as or only after the association of at least a portion of the personally identifiable information with the client device 1 or its user expired or was permanently deleted on the client device, the first computers, the second computers, or elsewhere outside these devices.

However, the third request 130 is preferably transmitted to the external server 1000 before expiry of the time limit T3 for accepting requests as given by the third party analytics software hosted on the external server 1000.

According to preferred aspects of this disclosure, the server-side session expiration at T2 is later than the client-side session expiration at T1 to reliably ensure that external server 1000 does not receive any tracked data when the session at the client is still active and to thereby achieve full anonymization. This constraint ensures that, at no point in time, there is an overlap in data awareness of the client and analytical tool (e.g., session ID stored on the client as well as in analytics database) that could potentially enable a real-time identification.

Figure 4:
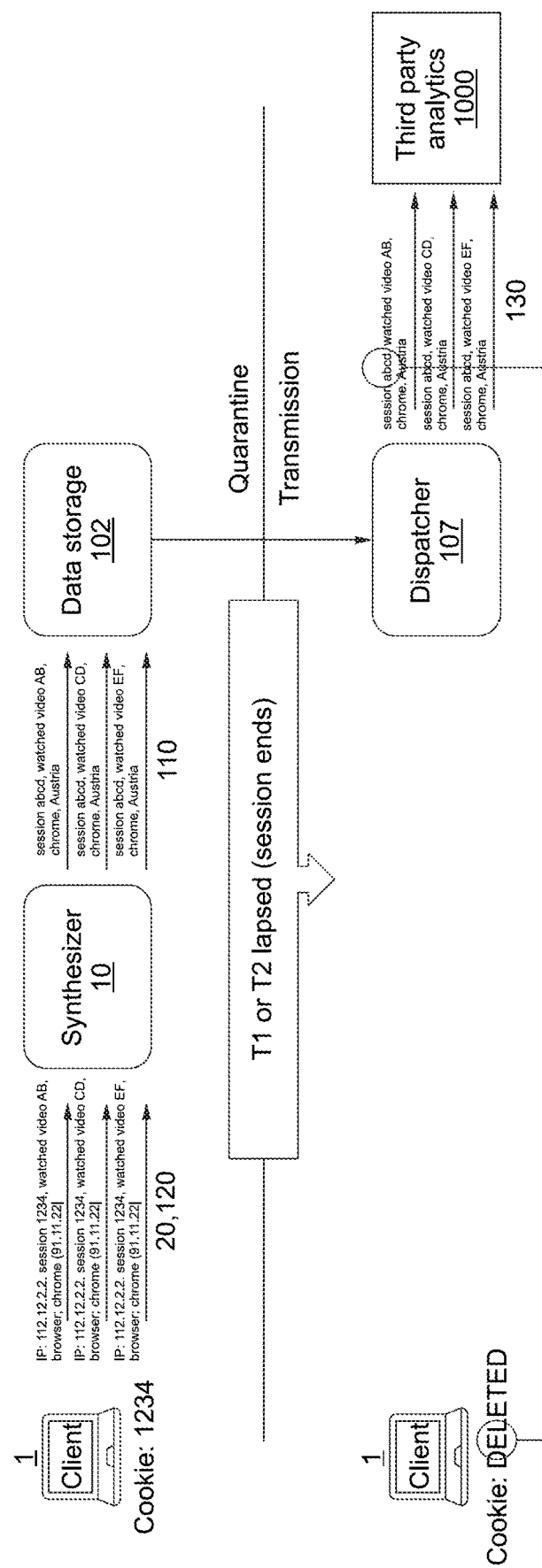
FIG. 4 illustrates a system according to the first embodiment of the present disclosure in which the data is retrieved from the data storage once or after expiry of time T1 or T2 of FIG. 3.

FIG. 4 illustrates a more detailed view onto the system according to the first embodiment of the present disclosure of FIG. 2. According to FIG. 4, the retrieved data that is based on the stored second data is retrieved from the data storage 102 once or after lapse or expiry of time T1 or T2 of FIG. 3 (and is preferably transmitted with the third request 130 to the third party analytics 1000 before T3 of FIG. 3).

As illustrated by FIG. 4, the synthesis of synthetic data is performed by the synthesizer 10 before the data is stored in data storage 102, as also shown by FIG. 2. In particular, a second request 20, 120 (tracking request 20, 120) is received directly or indirectly from the client device 1, wherein the second request 20, 120 includes the first data indicating actions that happened at a client device 1. In the merely illustrative example shown in FIG. 4, the first data indicates that videos AB, CD, and EF have been watched. The second request 20, 120 further includes personally identifiable information. In the illustrative example shown in FIG. 4, the PII includes the information that these videos have been watched during session 1234 at IP address 112.12.2.2. Each of these video views is a "hit" for the same session.

At the synthesizer 10 located upstream of the data storage 102, the PII is converted to synthetic data. In other words, synthetic data is synthesized by the synthesizer 10 to remove PII. In the illustrative example shown in FIG. 4, the PII "session 1234" is replaced by "session abcd", where the value "1234" is replaced by "abcd".

The converting into the synthetic data may thus include: replacing a first value of a first piece of the personally identifiable information by a synthesized value that is different from the first value; and including the synthetic data with the synthesized value into the first request 110.

The IP address, which is also PII, may be omitted or removed, partially replaced by new values, or may be converted to a geographic region, such as a country. For example, one or more values of a subset of the IP address, such as half of the IP address, can be replaced by one or more predetermined values (e.g., zero), so that only a geographic region, such as a country, and not a more detailed location of the client, such as a city, can be derived from the synthetic data synthesized for the IP address. According to another example, the system according to aspects of the disclosure may store associations between ranges of IP addresses and corresponding geographic regions, such as countries, and a particular IP address may be converted into a corresponding geographic region based on the stored associations. For example, the first range for the IP address may be associated with a first geographic region and a second range for the IP address, being different from the first range, may be associated with a second geographic region that is different from the first geographic region.

The replacing of the first value by the synthesized value may thus include: removing the first value, such that the first request 110 does not include and is not associated with the removed first value for the first piece of personally identifiable information.

In the illustrative example of FIG. 4, the IP address is converted to the country "Austria" in which the second request 20, 120 originated or in which the client device 1 is located. The IP address may be contained in a header associated with the second request 20, 120 received directly or indirectly from the client 1. The synthesized value "Austria" may be an attribute of the first request 110 or may be contained in a header associated with the first request 110. The synthesized value, here "Austria", indicative of the geographic region associated with the client device 1 is generated by the one or more computers hosting the data storage 102 or by other one or more computers that are in communication with the data storage 102. For example, the computers hosting the data storage 102 may receive the IP address and may convert the IP address into a geographic region, such as the country ("Austria").

The second request 20, 120 may also comprise other information, such as a version of the browser used by the user when performing the actions, and this information of a browser may also be obfuscated or modified in the synthetic data, as further explained below in context of FIG. 9.

The synthesizer 10 then includes the synthetic data as second data into the first request 110 and transmits the first request 110 to the data storage 102. The synthesizer 10 is communicatively connected with the client device 1 and the data storage 102. The synthesizer 10 may be hosted on the same or on a different computer or server compared to the data storage 102. In general, the data synthesis performed by the synthesizer 10 is optional to this disclosure may also be provided by a party service hosted on a server external to the computer server hosting the data storage 102. Alternatively, the data synthesis may form part of the disclosure and the present disclosure specifies particularly advantageous manners that contribute to further enhance data security of PII through improving anonymization of PII.

Upon receipt or obtaining of the first request 110, the data storage 102 stores at least the second data, which in this case is the synthetic data that was synthesized by the synthesizer 10, for a predetermined amount of time. During this predetermined amount of time, the stored data is in quarantine.

As soon as or after T1 or T2 lapsed or expired, the quarantine ends and the stored data can be retrieved from the data storage 102. At T1 or T2, the session may be considered at its end, because an association between the PII and the user or the client device 1 has expired, such as the cookie "1234" for session 1234 expired or was permanently deleted on the client device 1, the first computers, the second computers, or elsewhere outside these devices.

As illustrated by the example in FIG. 4, at or after the lapse or expiry of T1 or T2, i.e., at or after the end of the quarantine, the data storage 102 transmits the stored and retrieved data to a dispatcher 107 that is configured to generate the third request 130 to be transmitted to the external server 1000 hosting the third party analytics. In this third request 130, no PII is present, but instead the synthetic data is included in the third request 130, which was retrieved from the data storage 102 and which was synthesized by the synthesizer 10 based on the PII in the second request 20, 120 before inclusion into the first request 110. Furthermore, the third request 130 includes the first data (e.g., watched video AB) indicating the actions that happened at the client device 1.

That is, each of the first request 110 and the third request 130 is a further tracking request generated with obfuscated, hashed, generalized, reduced or otherwise (pseudo-)anonymized versions of the personally identifiable information of the second request 20, 120 for evaluating the actions by the user at the client device 1. As the external server 1000 can receive the third request 130 only after the lapse or expiry of T1 or T2, no simultaneous access to the third request 130 and to session 1234 at the client device 1 is possible by the third party analytics, thereby achieving the full anonymization of the PII. When the third request 130 arrives at the external server 1000 hosting the third party analytics, the session 1234 has already expired, for example by the Cookie 1234 having already expired or being already permanently deleted on the client device 1, the first computers, the second computers, or elsewhere outside these devices. That is, the quarantine reduces the probability or even completely prevents simultaneous access to the third request 130 and the session at the client device 1, which enhances data or even ensures data security for the PII and also leads to compliance with GDPR. The additional preferred means to provide improved data synthesis at the synthesizer 10 further enhance data security of the PII by contributing to full anonymization.

Figure 5:
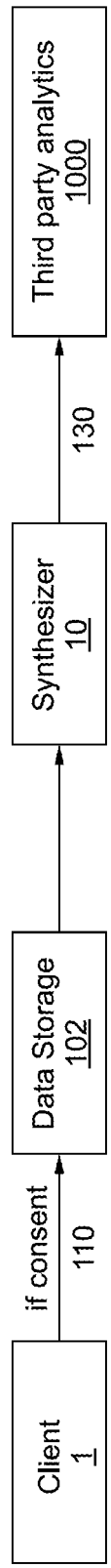
FIG. 5 illustrates a system according to a second embodiment of the present disclosure in which the data synthesis takes place after the data is stored in the data storage.

FIG. 5 illustrates a system according to a second embodiment of the present disclosure in which the data synthesis takes place at the synthesizer 10 after the second data is stored in the data storage 102.

Also in this embodiment, a method performed by the system relates to providing anonymized personally identifiable information, wherein the method is implemented by one or more first computers of the system (e.g., server 100 of FIG. 8), the method comprising: obtaining a first request 110, the first request 110 including first data indicating actions that happened at a client device 1 and second data that is associated with the first data and that is based on personally identifiable information associated with the client device 1; quarantining at least the second data, wherein the quarantining at least includes storing at least the second data in a data storage 102; retrieving data from the data storage 102, wherein the retrieved data is based on the stored second data; and generating a third request 130 to be transmitted to a server 1000 external to the one or more first computers, wherein the third request 130 includes the first data and synthetic data associated with the first data, wherein the synthetic data is based on the retrieved data and was synthesized based on the personally identifiable information. The second data may be or include the personally identifiable information or may be the synthetic data that was synthesized based on the personally identifiable information. The data retrieved from the data storage may be the (stored) second data (such as the PII or the synthetic data that was synthesized based on the personally identifiable information before storage as second data in the data storage), or may be the synthetic data that was synthesized based on the personally identifiable information of the stored second data. The synthetic data included in the third request may be the data retrieved from the data storage or may be synthetic data that was synthesized based on personally identifiable information of the retrieved data. The synthetic data may be a hashed, reduced generalized and/or obfuscated version of the personally identifiable information.

The external server 1000 may be configured to host the third party analytics tool software for analyzing actions that happened at the client device 1.

According to the second embodiment, the second data included in the obtained first request 110 and/or the data retrieved from the data storage 102 is the personally identifiable information associated with the client device 1.

The method performed by the system may optionally further include the operations associated with the data synthesis as performed by the synthesizer 10. In this embodiment, the synthesizer 10 is located downstream of the data storage 102, but before the data is transmitted to the external server 1000 hosting the third party analytics. The synthetic data synthesized by the synthesizer 10 may be stored in the data storage 102 before the synthetic data is retrieved from the data storage (as retrieved data that is based on the second data) and forwarded to be included into the third request 130 to be transmitted to the external server 1000, or the synthetic data may be directly forwarded to be included into the third request 130 to be transmitted to the external server 1000, as, for example, shown in FIGS. 6 and 7. The synthesizer 10 may be hosted on one or more computers of the system according to the disclosure.

The generating of the third request 130 as operation of the method performed by the system according to the second embodiment may comprise: synthesizing the synthetic data including converting at least some of the second data or retrieved data into the synthetic data and including the synthetic data instead of the second data or retrieved data into the third request 130.

Figure 6:
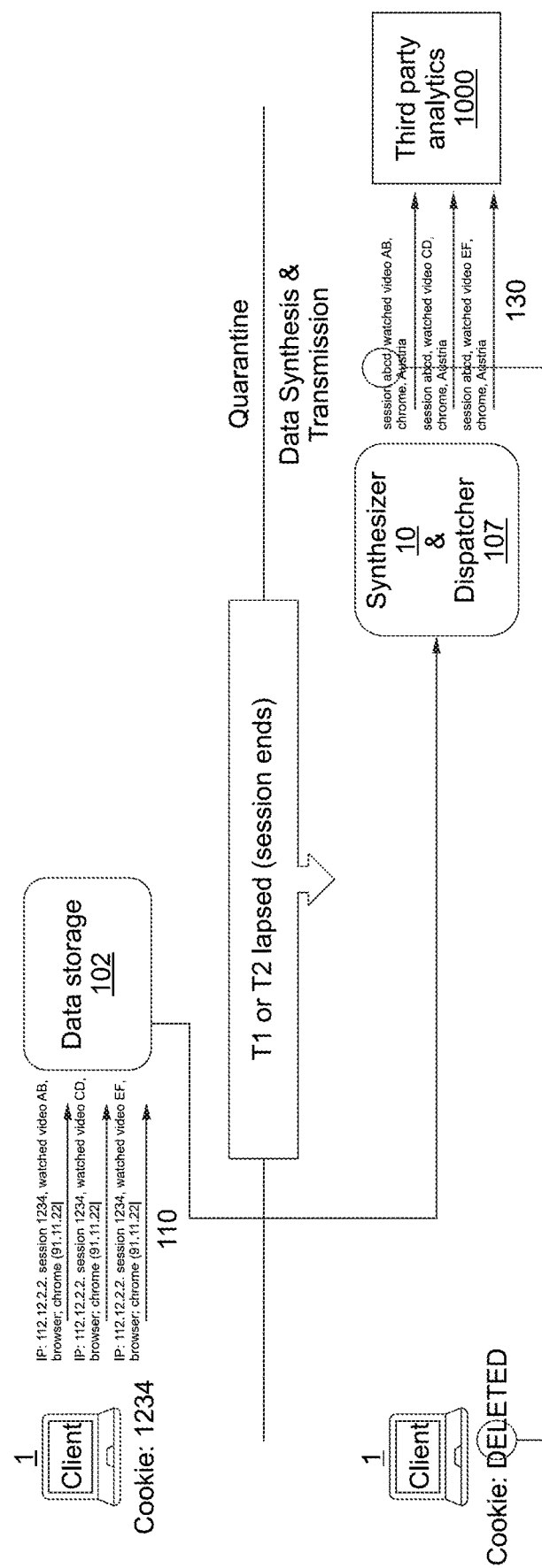
FIG. 6 illustrates a system according to a version of the second embodiment of the present disclosure in which the data is retrieved from the data storage once or after expiry of time T1 or T2 of FIG. 3.

FIG. 6 illustrates a more detailed view onto the system according to a version of the second embodiment of the present disclosure illustrated by FIG. 5. According to the version of FIG. 6, the retrieved data that is based on the stored second data is retrieved from the data storage 102 once or after lapse or expiry of time T1 or T2 of FIG. 3 (and the third request is preferably transmitted to the third party analytics 1000 before T3 of FIG. 3). That is, the quarantine ends at T1 or T2 after which the second data is retrieved from the data storage 102 as retrieved data that is based on the second data and the retrieved second data is forwarded in the system towards the synthesizer 10.

As illustrated by FIG. 6, the synthesis of synthetic data is performed by the synthesizer 10 after the second data is stored in data storage 102 and after the second data is retrieved from data storage 102 (as retrieved data that is based on the second data), as shown by FIG. 5. The exact location of the synthesizer 10 after the data storage 102 and before transmission to the third party analytics server 1000 is not essential in several locations possible as further described in context of FIG. 8. In particular, the synthesizer 10 may be located upstream with regard to the dispatcher 107 or may be integrated into the dispatcher 107.

In particular, a first request 110 (tracking request) is received from the client device 1, wherein the first request 110 includes the first data indicating actions that happened at a client device 1. In the merely illustrative example shown in FIG. 6, the first data indicates that videos AB, CD, and EF have been watched. The first request 110 further includes personally identifiable information. In the illustrative example shown in FIG. 6, the PII includes the information that these videos have been watched during session 1234 at IP address 112.12.2.2. Each of these video views is a "hit" for the same session.

At the synthesizer 10 located downstream of the data storage 102, the PII is converted to synthetic data. In other words, synthetic data is synthesized by the synthesizer 10 to remove PII. In the illustrative example shown in FIG. 6, the PII "session 1234" is replaced by "session abcd", where the value "1234" is replaced by "abcd".

The converting into the synthetic data may thus include: replacing a first value of a first piece of the personally identifiable information by a synthesized value that is different from the first value; and including the synthetic data with the synthesized value into the third request 130.

The IP address, which is also PII, may be omitted or removed, partially replaced by new values, or may be converted to a geographic region, such as a country. For example, one or more values of a subset of the IP address, such as half of the IP address, can be replaced by one or more predetermined values (e.g., zero), so that only a geographic region, such as a country, and not a more detailed location of the client, such as a city, can be derived from the synthetic data synthesized for the IP address. According to another example, the system according to aspects of the disclosure may store associations between ranges of IP addresses and corresponding geographic regions, such as countries, and a particular IP address may be converted into a corresponding geographic region based on the stored associations. For example, the first range for the IP address may be associated with a first geographic region and a second range for the IP address, being different from the first range, may be associated with a second geographic region that is different from the first geographic region.

The replacing of the first value by the synthesized value may thus include: removing the first value, such that the third request 130 does not include and is not associated with the removed first value for the first piece of personally identifiable information.

In the illustrative example of FIG. 6, the IP address is converted to the country "Austria" in which the first request 110 originated or in which the client device 1 is located. The IP address may be contained in a header associated with the first request 110 received from the client 1. The synthesized value "Austria" may be an attribute of the third request 130 or may be contained in a header associated with the third request 130. The synthesized value, here "Austria", indicative of the geographic region associated with the client device 1 may also be generated by the one or more computers hosting the data storage 102 or by other one or more computers that are in communication with the data storage 102. For example, the computers hosting the data storage 102 may receive the IP address and may convert the IP address into a geographic region, such as the country ("Austria").

The first request 110 may also comprise other information, such as a version of the browser used by the user when performing the actions, and this information of a browser may also be obfuscated or modified in the synthetic data, as further explained below in context of FIG. 9.

Upon receipt or obtaining of the first request 110, the data storage 102 stores at least the second data, which in this case is the PII, for a predetermined amount of time. During this predetermined amount of time, the stored data is in quarantine.

The synthesizer 10 is communicatively connected with the data storage 102. The synthesizer 10 may be hosted on the same or on a different computer or server compared to the data storage 102. In general, the data synthesis specifies particularly advantageous manners that contribute to further enhance data security of PII through improving anonymization of PII.

As soon as or after T1 or T2 lapsed or expired, the quarantine ends and the stored data can be retrieved from the data storage 102 and transmitted to the synthesizer 10. At T1 or T2, the session may be considered at its end, because an association between the PII and the user or the client device 1 has expired, such as the cookie "1234" for session 1234 expired or was permanently deleted on the client device, the first computers, the second computers, or elsewhere outside these devices.

As illustrated by the example in FIG. 6, at or after the lapse or expiry of T1 or T2, i.e., at or after the end of the quarantine, the synthesizer 10 receives the retrieved second data from the data storage 102 and synthesizes the synthetic data based on the second data (PII) retrieved from the data storage 102. The synthesizer 10 or the dispatcher 107 includes the synthetic data into the third request 130. The dispatcher 107 then transmits the third request 130 to the external server 1000, preferably before T3 lapsed. T3 may be a maximum accepted delay of data within the analytics system before the data is lost.

In this third request 130, no PII is present, but instead the synthetic data is included in the third request 130, which was synthesized by the synthesizer 10 based on the PII in the first request 110 before inclusion into the third request 130.

Furthermore, the third request 130 includes the first data (e.g., watched video AB) indicating the actions that happened at the client device 1.

That is, the third request 130 is a further tracking request generated with obfuscated, reduced, generalized, hashed or otherwise (pseudo-)anonymized versions of the personally identifiable information of the first request 110 for evaluating the actions by the user at the client device 1. As the external server 1000 can receive the third request 130 only after the lapse or expiry of T1 or T2, no simultaneous access to the third request and to session 1234 at the client device 1 is possible by the third party analytics, thereby achieving the full anonymization of the PII. When the third request 130 arrives at the external server 1000 hosting the third party analytics, the session 1234 has already expired, for example by the Cookie 1234 having already expired or being already permanently deleted on the client device, the first computers, the second computers, or elsewhere outside these devices. That is, the quarantine reduces the probability or even completely prevents simultaneous access to the third request and the session at the client device, which enhances data or even ensures data security for the PII and also leads to compliance with GDPR. The additional preferred means to provide improved data synthesis at the synthesizer 10 further enhance data security of the PII by contributing to full anonymization.

Figure 7:
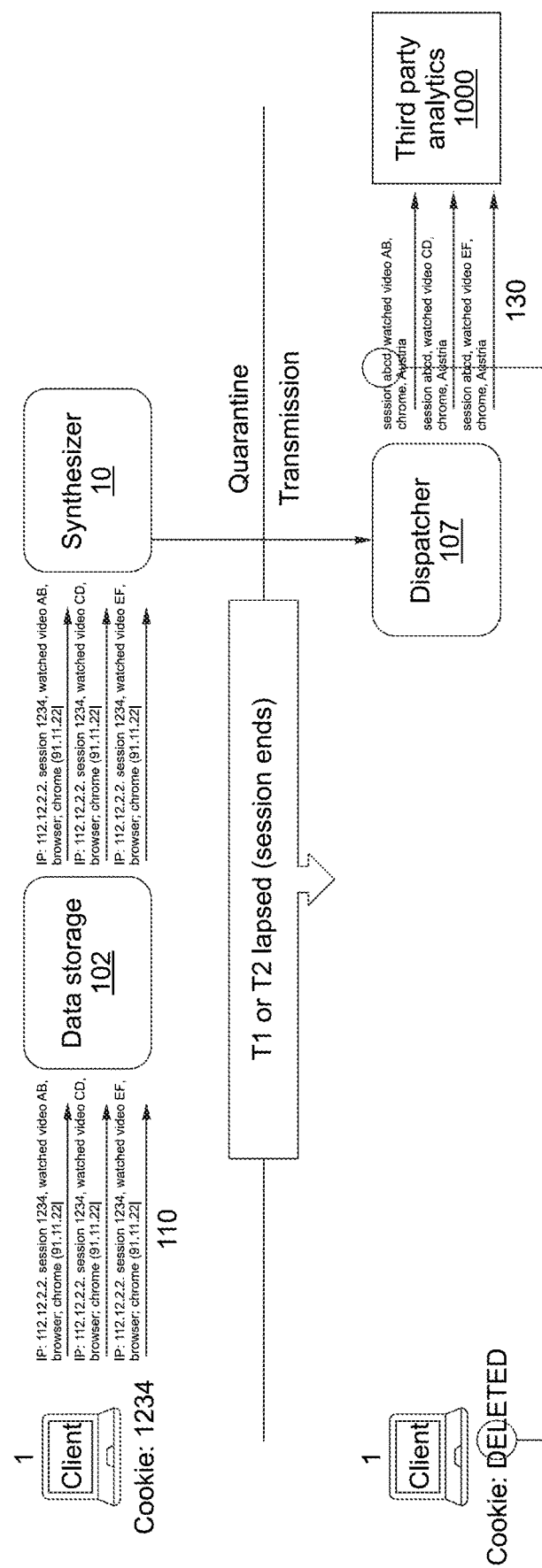
FIG. 7 illustrates a system according to another version of the second embodiment of the present disclosure in which the data is retrieved from the data storage before expiry of time T1 or T2 of FIG. 3, but in which the synthetic data synthesized by the synthesizer is transmitted to the third party analytics once or after expiry of time T1 or T2 of FIG. 3.

FIG. 7 illustrates a detailed view onto the system according to another version of the second embodiment of the present disclosure as illustrated by FIG. 5. In FIG. 7 the second data is retrieved from the data storage before the end of the quarantine, i.e., before lapse or expiry of time T1 or T2 of FIG. 3. During the quarantine, the synthetic data is synthesized by the synthesizer 10 based on the stored second data and may then either be stored in the data storage 102 before the synthetic data is retrieved from the data storage and forwarded to be included into the third request 130 to be transmitted to the external server 1000, or may be directly (i.e., without storing in the data storage) forwarded to be included into the third request 130 to be transmitted to the external server 1000. In any case, the synthetic data from the synthesizer 10 may be forwarded towards the dispatcher 107 during the quarantine but is transmitted with the third request 130 to the third party analytics server 1000 only after the end of the quarantine as shown in FIG. 7, i.e., at or after lapse or expiry of time T1 or T2 of FIG. 3 (and preferably before T3 of FIG. 3). Alternatively, according to a variant not shown in FIG. 7, the synthetic data may be synthesized by the synthesizer 10 based on the stored second data and is then stored in the data storage 102 during the quarantine, but may be retrieved from the data storage 102, as retrieved data that is based on the second data, and forwarded in the system towards the dispatcher 107 to be included into the third request 130 to be transmitted to the external server 1000 only after the end of the quarantine, i.e., as soon as or after lapse or expiry of T1 or T2.

As illustrated by FIG. 7, the synthesis of synthetic data is performed by the synthesizer 10 after the second data is stored in data storage 102 but before the end of the quarantine at T1 or T2. That is, the quarantining includes retrieving of the stored second data from the data storage 102 and the synthesizing of the synthetic data based on the retrieved second data. The exact location of the synthesizer 10 downstream of the data storage 102 and upstream of the dispatcher is not essential and several locations are possible as mentioned above and as further described in context of FIG. 8. In particular, the synthesizer 10 may be located upstream with regard to the dispatcher 107 or may be integrated into the dispatcher 107.

In particular, a first request 110 (tracking request) is received or obtained from the client device 1, wherein the first request 110 includes the first data indicating actions that happened at a client device 1. In the merely illustrative example shown in FIG. 7, the first data indicates that videos AB, CD, and EF have been watched. The first request 110 further includes personally identifiable information. In the illustrative example shown in FIG. 7, the PII includes the information that these videos have been watched during session 1234 at IP address 112.12.2.2. Each of these video views is a "hit" for the same session.

Upon receipt or obtaining of the first request 110, the data storage 102 stores at least the second data, which in this case is the PII. During storage and during quarantine, the stored data can in this case be retrieved, such as by the synthesizer 10 for data synthesis.

At the synthesizer 10 located downstream of the data storage 102, the PII is converted to synthetic data. In other words, synthetic data is synthesized by the synthesizer 10 to remove PII. In the illustrative example shown in FIG. 7, the PII "session 1234" is replaced by "session abed", where the value "1234" is replaced by "abed".

The converting into the synthetic data may thus include: replacing a first value of a first piece of the personally identifiable information by a synthesized value that is different from the first value; and including the synthetic data with the synthesized value into the third request 130.

The IP address, which is also PII, may be omitted or removed, partially replaced by new values, or may be converted to a geographic region, such as a country. For example, one or more values of a subset of the IP address, such as half of the IP address, can be replaced by one or more predetermined values (e.g., zero), so that only a geographic region, such as a country, and not a more detailed location of the client, such as a city, can be derived from the synthetic data synthesized for the IP address. According to another example, the system according to aspects of the disclosure may store associations between ranges of IP addresses and corresponding geographic regions, such as countries, and a particular IP address may be converted into a corresponding geographic region based on the stored associations. For example, the first range for the IP address may be associated with a first geographic region and a second range for the IP address, being different from the first range, may be associated with a second geographic region that is different from the first geographic region.

The replacing of the first value by the synthesized value may thus include: removing the first value, such that the third request 130 does not include and is not associated with the removed first value for the first piece of personally identifiable information.

In the illustrative example of FIG. 7, the IP address is converted to the country "Austria" in which the first request 110 originated or in which the client device 1 is located. The IP address may be contained in a header associated with the first request 110 received from the client 1. The synthesized value "Austria" may be an attribute of the third request 130 or may be contained in a header associated with the third request 130. The synthesized value, here "Austria", indicative of the geographic region associated with the client device 1 may also be generated by the one or more computers hosting the data storage 102, synthesizer 10 and/or dispatcher 107, or by other one or more computers that are in communication with these components of the system. For example, the computers hosting the system may receive the IP address and may convert the IP address into a geographic region, such as the country ("Austria").

The first request 110 may also comprise other information, such as a version of the browser used by the user when performing the actions, and this information of a browser may also be obfuscated or modified in the synthetic data, as further explained below in context of FIG. 9.

The synthesizer 10 is communicatively connected with the data storage 102. The synthesizer 10 may be hosted on the same or on a different computer or server compared to the data storage 102. In general, the data synthesis specifies particularly advantageous manners that contribute to further enhance data security of PII through improving anonymization of PII.

Before T1 or T2 lapsed or expired, the synthesizer 10 retrieves the second data stored in the data storage 102 and performs the anonymization (which may include obfuscation, reduction, generalization and/or hashing) of the PII by generating the synthetic data based on the PII.

The synthesizer 10 or the dispatcher 107 includes the synthetic data into the third request 130. As soon as or after T1 or T2 lapsed or expired, the quarantine ends and the synthetic data can be transmitted with the third request 130 to the external server 1000 by the dispatcher 107, preferably before T3 lapsed. For example, the synthesizer 10 may transmit the synthetic data to the dispatcher 107 as soon as or after T1 or T2 lapsed or expired. Alternatively, the synthesizer 10 is integrated in the dispatcher 107, which dispatcher 107 starts transmitting the third request 130 to the third party analytics server 1000 only as soon as or after T1 or T2 lapsed or expired.

At lapse or expiry of T1 or T2, the session may be considered at its end, because an association between the PII and the user or the client device 1 has expired, such as the cookie "1234" for session 1234 expired or was permanently deleted on the client device 1, the first computers, the second computers, or elsewhere outside these devices.

In the third request 130 transmitted to the external server 1000, no PII is present, but instead the synthetic data is included in the third request 130, which was synthesized by the synthesizer 10 based on the PII retrieved from the data store 102 and included in the first request 110. Furthermore, the third request 130 includes the first data (e.g., watched video AB) indicating the actions that happened at the client device 1.

That is, the third request 130 is a further tracking request generated with obfuscated, hashed, reduced, generalized or otherwise (pseudo-)anonymized versions of the personally identifiable information of the first request 110 for evaluating the actions by the user at the client device 1. As the external server 1000 also in this case of FIG. 7 can receive the third request 130 only after the lapse or expiry of T1 or T2, no simultaneous access to the third request and to session 1234 at the client device 1 is possible by the third party analytics, thereby achieving the full anonymization of the PII. When the third request 130 arrives at the external server 1000 hosting the third party analytics, the session 1234 has already expired, for example by the Cookie 1234 having already expired or being already permanently deleted on the client device, the first computers, the second computers, or elsewhere outside these devices. That is, the quarantine reduces the probability or even completely prevents simultaneous access to the third request and the session at the client device, which enhances data or even ensures data security for the PII and also leads to compliance with GDPR. The additional preferred means to provide improved data synthesis at the synthesizer 10 further enhance data security of the PII by contributing to full anonymization.

Figure 8:
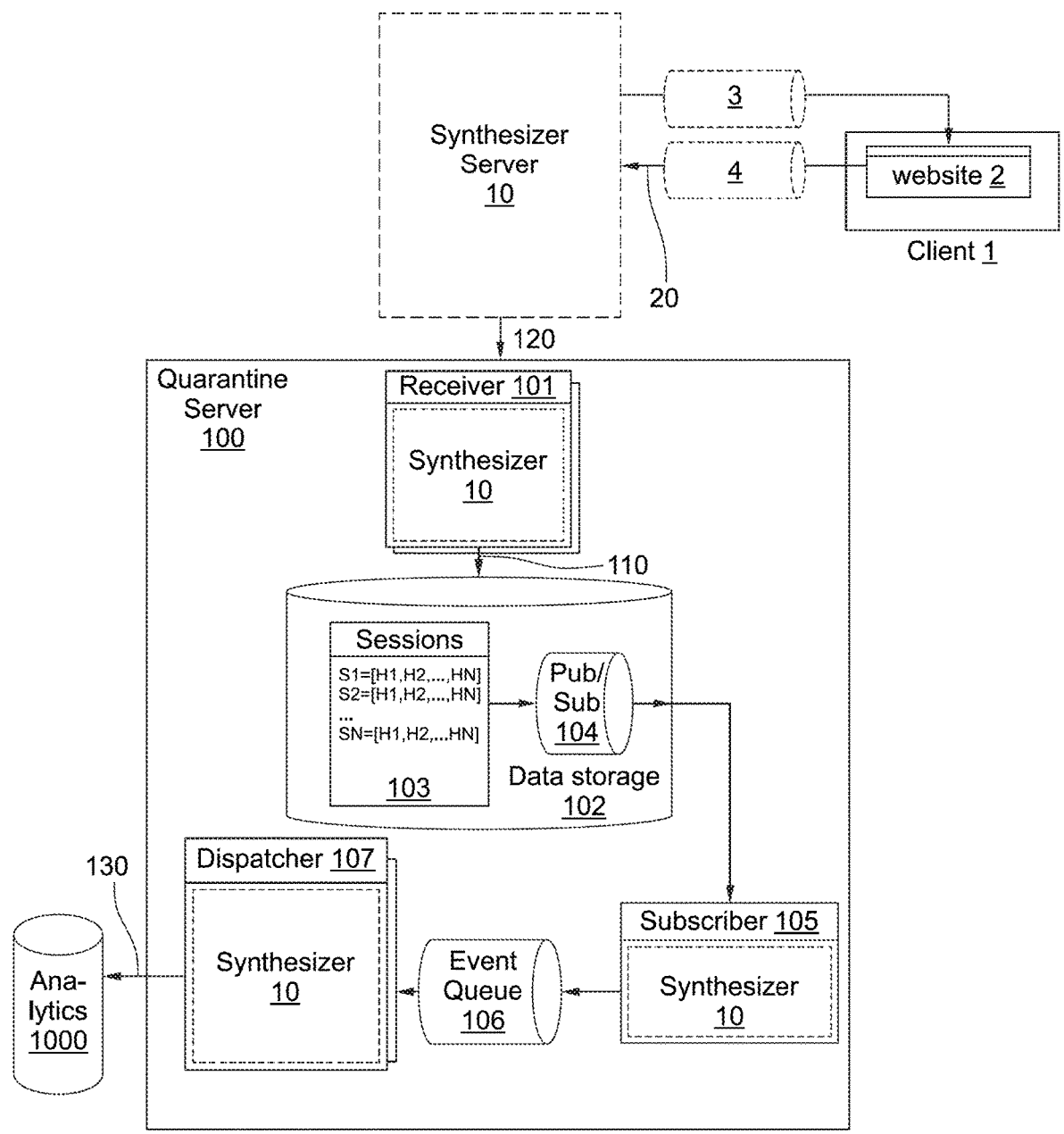
FIG. 8 illustrates more details about the system according to the first and second embodiments of the present disclosure in which the data synthesis is illustrated as optional and can take place at any one or more of the various components of the system before or after the data is stored in the data storage.

FIG. 8 illustrates more details about the system according to the first and second embodiments of the present disclosure as illustrated by FIGS. 2 to 7. The system of the disclosure includes the quarantine server 100 as an example of the one or more first computers. The quarantine server 100 may host the data storage 102 and the dispatcher 107 referred to by any one of the above described aspects and embodiments. The dispatcher 107 is configured to transmit data to the external server 1000 hosting the third party analytics software. The server 1000 is not a sub-component of the system according to the disclosure. The synthesizer 10 may be hosted on a server operated by a third-party service external to the system of this disclosure. Alternatively, the quarantine server 100 may further host as optional component the synthesizer 10. In any case, the quarantine server 100 may further host as optional components a receiver 101, a subscriber 105 and an event queue 106.

The system may include the optional synthesizer 10 referred to in any one of the above described aspects and embodiments. In FIG. 8, the data synthesis is illustrated as optional to the disclosure and can take place at the synthesizer 10 that can be located at any one or more of the various components of the system shown in FIG. 8 before or after the second data is stored in the data storage 102. In particular, the synthesizer 10 may be hosted on a synthesizer server 10 forming part of the system according to aspects of this disclosure but being separate from the quarantine server 100 that is in communication with the synthesizer server 10.

Alternatively, synthesizer 10 may be hosted on the quarantine server 100 according to aspects of this disclosure, such as in the receiver 100 upstream of the data storage 102 or in the subscriber 105 or the dispatcher 107 downstream of the data storage 102 or in any other component hosted on the quarantine server 100. Having the synthesizer in the subscriber or dispatcher allows that load can be taken away from data processing components (e.g., receiver) upstream the data storage, which will then have improved reaction times and will provide better user experience at the frontend of the system. Further, synthetic data is often larger in size than the original data, so that the amount of required memory in the data storage can be reduced. Having the synthesizer in the dispatcher instead of the subscriber allows that the subscriber can be kept more efficient for the subscriber to efficiently to receive the data associated with the expired sessions. By having the synthesizer in the receiver or further upstream of the receiver, the anonymization of the PII is performed as early as possible and the risk of leaking PII, such as through an attack onto the data storage, is reduced. Also, the synthetic data can be previewed before storing the data in the data storage, which allows reducing errors when testing the system or when processing the data before transmission to the external server.

A user is interacting with an application 2, such as a website (e.g., in a browser or app), at the client device 1 and the user's actions, such as all actions belonging to a common session of the application, browser, app or website, are tracked for evaluation by an analytics software hosted on an external server 1000. A second request 20 or 120 may be transmitted directly or indirectly from the client device 1 to the quarantine server 100 (e.g., to the receiver 101). The second request 20, 120 may be transmitted indirectly from the client device 1 to the quarantine server 100 via a distribution server (not shown). The distribution server may receive the second request 20 from the client device 1 and may forward the second request 120 to the quarantine server 100 and optionally to one or more further computers. The distribution server may be located between the client device 1 and the quarantine server 100 and/or may be communicatively coupled with the client device 1 and the quarantine server 100.

In case of the synthesizer 10 being hosted on one or more second computers located upstream of the data storage 102 and inside or outside of the quarantine server 100, the second request 20 or 120 may be transmitted directly or indirectly from the client device 1 to the one or more second computers. The one or more second computers can be among the one or more first computers of the quarantine server 100, but may be located upstream of the data storage 102. Alternatively, the one or more second computers can be external to (e.g., upstream to) but communicatively coupled with the one or more first computers, wherein the one or more second computers can include a synthesizer server 10 or another computer system that is located upstream of the quarantine server 100. In any case, the second request may be transmitted indirectly from the client device 1 to the one or more second computers via the distribution server (not shown). The distribution server may receive the second request 20 from the client device 1 and may distribute the second request 20, 120 to the one or more second computers and optionally to one or more further computers. The distribution server may be located between the client device 1 and the one or more second computers and/or may be communicatively coupled with the client device 1 and the one or more second computers. This second request 20, 120 may include first data identifying the actions and may further include the personally identifiable information, PII, that can directly or indirectly identify the user or the client device 1. The PII can, for example, include a session identifier associated with the user of the client device 1, a portion of an IP address of the client device 1, a user-agent of a browser used by the user at the client device 1, a contact address associated with the user of the client device 1, and/or a name associated with the user of the client device 1.

The second request 20 may pass one or more optional transformers 3, 4 (e.g., Akamai load balancer) that are configured to transform a piece of information of the PII into an obfuscated, reduced, generalized, hashed or otherwise (pseudo-)anonymized form of this piece of information. The transformers 3, 4 may be hosted on the quarantine server 100 or may be hosted on one or more other computers, such as the one or more second computers.

For example, the transformer 3, 4 may be configured to convert an IP address associated with the client device 1 to a geographic region, such as a country, that is associated with the client device 1 while removing or omitting the IP address from the request. For example, the IP address may be contained in a header associated with the request sent by the client 1 to the transformer 3, 4. The synthesized value indicating the geographic region, as synthesized by the transformer 3, 4 from the IP address, may be an attribute of the second request 20 or may be contained in a header associated with the second request 20.

This header may indicate the geographic region, such as the country, in which the user's request has been generated or has entered the network or system of FIG. 8. Instead of sending the real IP address of the client 1 or user to the analytics software on server 1000 and relying on it for turning the IP-address into the user's location, the system will explicitly send the user's geographic region, such as a country to the server 1000. The real IP address of the user may be discarded.

For example, the request of the user with the IP address 188.105.236.52 will enter the transformer (e.g., Akamai network in Germany). Then, the transformer 3, 4 will convert the IP address into the corresponding geographic region, such as the corresponding country. The information of the country will be forwarded by the transformer 3, 4 towards the quarantine server 100 and eventually to the analytics software hosted on server 1000. This change within the data supply chain increases the security for not transmitting any parts of the IP address to the analytics system (e.g., Google Analytics), which makes it harder for any parties to identify a user based on the IP address. The users request may be sent to the next entry point.

As an alternative to transformers 3, 4, the synthesizer 10 may synthesize synthetic data for the IP address. For example, the IP address, which is also PII, may be omitted or removed, partially replaced by new values, or may be converted to a geographic region, such as a country, by the synthesizer 10.

For example, one or more values of a subset of the IP address, such as half of the IP address, can be replaced by one or more predetermined values (e.g., zero), so that only a geographic region, such as a country, and not a more detailed location of the client, such as a city, can be derived from the synthetic data synthesized for the IP address. The subset of the IP address can be replaced by predetermined values and the remaining subset of the IP address, whose one or more values are not being replaced by a synthesized value, is indicative of a geographic region, such as a country, associated with a location of the client device 1. For example, the IP-address 188.105.236.52 will be synthesized by the synthesizer 10 into 188.105.0.0 before being forwarded. This effectively creates IP pools that can include up to 65025 devices and therefore do not allow any form of personal identification. This anonymization as well as reduction effort, which is done by aspects of the present disclosure, offers anonymization to the upmost extent, while still being able to report on a region (e.g., country) level.

According to another example, the synthesizer 10 itself or the quarantine server 100 may store associations between ranges of IP addresses and corresponding geographic regions, such as countries, and a particular IP address may be converted by the synthesizer 10 into a corresponding geographic region based on the stored associations. For example, the first range for the IP address may be associated with a first geographic region and a second range for the IP address, being different from the first range, may be associated with a second geographic region that is different from the first geographic region.

At the quarantine server 100, a method for providing anonymized personally identifiable information is implemented, the method comprising: obtaining the first request 110 at the receiver 101 or the data storage 102, the first request 110 including first data indicating actions that happened at the client device 1 and second data that is associated with the first data and that is based on personally identifiable information associated with the client device 1; quarantining at least the second data, wherein the quarantining at least includes storing at least the second data 103 in the data storage 102; retrieving, such as by the subscriber 105 or the synthesizer 10, data, such as the second data, from the data storage 102, wherein the retrieved data is based on the stored second data; and generating, by the dispatcher 107 or the synthesizer 10, a third request 130 to be transmitted by the dispatcher 107 to the server 1000 external to the quarantine server 100, wherein the third request 130 includes the first data and synthetic data associated with the first data, wherein the synthetic data is based on the retrieved data and was synthesized by the synthesizer 10 based on the personally identifiable information.

In case the synthesizer 10 is placed upstream of the data storage 102 but within the quarantine server 100, such as in the receiver 101, 120 may refer to the second request received directly or indirectly from the client 1. Second request 20 may first be transmitted by the client device 1 to the distribution server (not shown) before the distribution server transmits the second request 120 to the receiver 101. Alternatively, the client device 1 may directly transmit the second request 20, 120 to the receiver 101. In case the synthesizer 10 is placed upstream of the data storage 102 but outside (and upstream of) the quarantine server 100, such as in the separate synthesizer server 10, 120 and 110 may refer to the same first request obtained by the quarantine server 100. Also in this case, the second request 20 may first be transmitted by the client device 1 to the distribution server (not shown) before the distribution server transmits the second request 20 to the synthesizer server 10. Alternatively, the client device 1 may directly transmit the second request 20 to the synthesizer server 10.

After the second request 20, 120 is received by receiver 101 at the server 100, a synthesizer 10 located at the receiver 101 may synthesize the second data based on the PII in case the data synthesis is not already happened at the synthesizer server 10 external to the quarantine server 100. However, there may be no synthesis of synthetic data prior to storage of the second data in the data storage 102, because such synthesis may take place downstream of the data storage 102, such as in the subscriber 105 or the dispatcher 107. In case the synthesis of synthetic data takes place in the synthesizer 10 downstream of the data storage 102, such as in the subscriber 105, the synthetic data synthesized by the synthesizer 10 may not be stored in the data storage 102 but may rather be directly forwarded (e.g., via the event queue 106) to the dispatcher 107 to be included into the third request 130 to be transmitted to the external server 1000 by the dispatcher 107. Alternatively (not shown in FIG. 8), the synthetic data synthesized by the synthesizer 10, such as by the subscriber 105, may be stored in the data storage 102 before the synthetic data is retrieved from the data storage 102 (as retrieved data that is based on the second data) and forwarded (e.g., via the event queue 106) to the dispatcher 107 to be included into the third request 130 to be transmitted to the external server 1000 by the dispatcher 107.

In any case, the second data is quarantined including storing the second data 103 in the data storage 102. Quarantining at least the second data may include storing the second data associated with a key, SN, in the data storage 102, preferably wherein the key is associated with the personally identifiable information associated with the second data. The quarantining of at least the second data may further include quarantining the first data (action data). Quarantining the first and second data may include storing the second data and the first data, both associated with the key, in the data storage 102.

For example, the second data 103 may be stored with data stored 102 such that the key, which may be associated with a session identifier identifying the session at the client device 1, links all pieces of data of the first and/or second data being stored in the data storage 102. For example, all "hits" associated with the same session ID may be stored in association with each other and/or together, as illustrated in FIG. 8.

In FIG. 8, S1 represents the respective session ID. The value of S1 can be the respective session ID itself, or a key associated with the session ID, depending on if the synthetization of the synthetic data has already taken place when storing the second data 103. In case of synthesis of synthetic data by synthesizer 10 before the storing of the second data (synthetic data) in the data storage 102, S1 will be a synthetic Key S1 (e.g., 04d0fde5cc3160ea220cf4535b3239a8e36d475213-d2f77301553eca84203122). In case of synthesis of synthetic data by synthesizer 10 after the storing of the second data (PII) in the data storage 102, S1 will be the original value (e.g., 1682390.1648740198429), such as from the Cookie or other identifier.

The respective hits represent values such as H1=Pageview on the website, or digital platform, H2=Video Start of Videos "abc", and H3=end of Video "abc". Values, such as the "Session ID" or "IP Address", may be determined along with the hits and will be associated with the corresponding session.

The receiver 101 can take all hit requests that are received and can handle authentication and communication with the data storage 102. The receiver 100 can be configured to: Create new session objects for hits, using the session IDs as key; and append the hit data to the session object. The receiver 101 can be a lightweight service that can be replicated multiple times and each receiver can be able to act independently of the other receivers. This would allow for fast horizontal scaling with increased load.

The data storage 102, which may be a database, allows for efficient temporary storage. The data storage or the database may provide for in-memory data storage.

The data storage 102 may be configured to support data persistency. Data persistency, however, requires writing data (at least periodically) on disk, but is only required in the event of database failure. The data storage 102 may offer the possibility to run in a high availability setup through a proxy cluster pattern, in which at least one, two or three master nodes, each with a dedicated stand-by node is provisioned. This stand-by node serves as a fall-back, should the master node(s) crash. At least one or two other partitions in the cluster are available if both the master and its attached stand-by crashes. This up to sixfold redundancy will give very high availability guarantees. Overall, the data store 102 may provide a good trade-off between availability, data consistency and latency.

The data storage 102 can provide the possibility of creating keyspace notifications, which makes use of a publish and subscribe (Pub/Sub) feature 104 to broadcast all keys that have exceeded their time to live (TTL) to a dedicated channel. In this disclosure, these keys can be represented by the session IDs. Every application listening to this channel (one or more Subscribers 105) would therefore be informed of all the session IDs that have been expired or were deleted and can therefore handle further processing.

An identifier (e.g., Cookie) may be associated with the personally identifiable information and the client device 1 (or its user) and may thus be an example of the herein described association of the personally identifiable information with the client device 1 (or its user). The quarantine may end (e.g., the retrieved data is retrieved from the data storage 102, or the third request 130 is transmittable to the external server) once this association of PII with the client device 1 (or its user) is expired or permanently deleted on the client device 1, the first computers (e.g., quarantine server 100, such as in the receiver 101), the second computers (e.g., synthesizer 10 in the quarantine server 100 or synthesizer server 10), or elsewhere outside these devices.

The subscriber 105 may be configured to receive a notification that the association of the personally identifiable information with the client device 1 (or its user), such as the identifier (e.g., Cookie) associated with the personally identifiable information, is expired or permanently deleted on the client device 1, the first computers (e.g., quarantine server 100), the second computers (e.g., synthesizer 10 or synthesizer server 10), or elsewhere outside these devices. The subscriber 105 may also be configured to publish information about the expired or permanently deleted association or identifier to an event queue 106.

The subscriber 105 may be a service that listens to the notification channel broadcasting expired session IDs in order to process them. Since all subscribers 105 may receive all messages by design, it may have limited and reduced functionality and may have a higher theoretical throughput than the publishing rate of the data storage 102. Sending out hits to the analytics server 1000 using the HTTP protocol directly from the subscriber 105 might lead to long cycle times (even when done asynchronously) and could introduce phases in which more session expiry notifications are published than can be processed.

Therefore, the subscriber 105 can receive all messages from the data storage 102 but only publishes the expired session information into the event queue 106. The notification through the "pub/sub" 104 functionality of the keyspace notifications may be based on the "fire-and-forget" paradigm. This means that a notification is fired, even if no subscriber is currently available, which would lead to a situation in which session data is stored in the data storage 102 without any downstream processes ever being aware of its expiry. This could build up residual objects that are never cleaned up or forwarded to the analytics server 1000. It is therefore preferred to deploy a minimum of two or three subscribers 105 to ensure fault tolerance and avoid residual objects. Since all subscribers will process the same messages, data de-duplication may be implemented downstream of the subscribers 105.

Performing the actual HTTP request for each hit to the analytics server 1000 can be slow because of the response time of the targeted Servers. Therefore, aspects of the present disclosure propose the use of the event queue 106 that acts as a buffer for all analytics hits, which are regarded as whitelisted and can be forwarded to the server 1000. The event queue 106 can help to loosely couple the services that filters out all hits (keyspace notifications and subscriber 105) and the service that will do the actual HTTP request (Dispatcher 107). It enables the use of a "pull" pattern, in which the dispatcher 107 takes up messages from the queue 106 whenever the Dispatcher 107 is ready, which acts as a buffer in traffic peaks.

Publishing messages into the queue 106 can be achieved more efficiently using compression, batching and/or optimized communication protocols. If more sessions expire than an individual subscriber 105 can publish to the queue 106, it might lead to a traffic jam in the subscriber memory which may lead to overflow, if this state is ongoing for a prolonged period. The subscriber 105 would then be temporarily unavailable, and all unprocessed sessions in its memory would not be dispatched. To overcome this implication, publishing to the task queue is optimized in aspects of the present disclosure through batching and compression as well as asynchronous communication, to optimize throughput capabilities.

The dispatcher 107 can be configured to pull the information about the expired or permanently deleted association or identifier from the queue 106, and to retrieve, from the data storage 102 and based on the pulled information, the second data, and preferably also the first data, for the generating of the third request 130.

The dispatcher can be responsible to pull expired session IDs from the queue 106 and retrieve all hits attributed to the session ID from the database. Afterwards dispatcher 107 forwards the HTTP hits to the analytics server 1000 (e.g., Google Analytics). Similar to the Receiver 101, the dispatcher 107 should preferably be a lightweight service that can be replicated multiple times and be able to act independently of the other dispatcher replications, which in turn allows for fast horizontal scaling with increasing load.

In other words, the subscriber 105 may not retrieve data from the data storage 102, but is only informed of expired session IDs, which are then subsequently passed on into the event queue 106. The dispatcher 107, however, reads data from the data storage 102 and forwards the retrieved data to the external server 1000 hosting the analytics. Keys SN expire when a specific time threshold, such as T1 or T2, is exceeded. The system as illustrated by FIG. 8 knows that the session has ended and the corresponding key, which is reflecting the session ID, has expired. The message with the session expired is broadcast through the publication and subscription channel 104. The subscriber 105 is listening to this channel 104 and receives messages which include the session ID and the session ID into the event queue 106. The dispatcher 107 takes a random session ID from the event queue 106, retrieves all hits associated with the session ID from the data storage 102 and sends the retrieve data to the external server 1000 hosting the analytics only as soon as or after lapse or expiry of T1 or T2, but preferably before lapse or expiry of T3.

The system as illustrated by FIG. 8 may be operated in accordance with each of FIGS. 2 to 7. T2 is set between T1 and T3 preferably such that a) the time difference between T2 and T1 accounts for the maximum delay of the operations taking place before storing the second data in the data storage 102, such as the operations performed by synthesizer server 10 external to the quarantine server 100 or by the receiver 101, and b) the time difference between T2 and T3 accounts for a maximum delay of the operations taking place in the quarantine server 100 after the data storage 102, such as the operations performed by the subscriber 105, the event queue 106 and/or the dispatcher 107. This may be done to avoid a data loss. For example: T1=3.5 hours after T0, T2=3.75 hours after T0, and T3=4.0 hours after T0.

With regard to the delay of T2 with regard to T1 and a), new hits may be inserted into the data storage 102 after the server-side session T2 has expired. This could be a result of the temporary downtime of the receiver 101 or communication issues with the receiver 101. As a result, a new session object may be created in the data storage 102 containing the delayed hits. Such hits may be delivered after the expiration of T3 and may be rejected by the analytics software hosted on the external server 1000. The probability of such an unlikely scenario can be further reduced by increasing the temporal gap between T1 (e.g., moving T1 earlier) and T2 (e.g., moving T2 later). Regarding delay of T3 with regard to T2 and b, there may be a temporary disruption of the subscriber, event queue or dispatcher, so that hits may be delivered after the expiration of T3 and may be rejected by the analytics software hosted on the external server 1000, resulting in data loss. The probability for this scenario, which is unlikely, may be further reduced by increasing the temporal gap between T2 (e.g., by moving T2 earlier) and T3 (e.g., by moving T3 later).

In general, any latency or downtime can also be reduced by deploying multiple replications of each of the services 101-107 hosted on the quarantine server 100 to achieve redundancy.

FIG. 9 illustrates a data object according to aspects of the disclosure that maps different values for a piece of personally identifiable information to a same synthesized value.

As mentioned, the personally identifiable information can, for example, include a session identifier associated with a user of the client device 1, a portion of an IP address of the client device 1, a user-agent of a browser used by a user at the client device 1, a contact address associated with a user of the client device 1, and/or a name associated with a user of the client device 1. Other PII is possible and encompassed by the present disclosure. Aspects of the present disclosure may synthesize all of these different pieces of personally identifiable information before transmitting them to the external server hosting for analytics software.

In each of the above FIGS. 1 to 8, it has been described the optional operations for obfuscating, reducing, generalizing and/or hashing (or otherwise pseudo-anonymizing) personally identifiable information, such as any one of the herein mentioned pieces of PII (e.g., a user-agent, IP address, session ID), by means of synthesizing synthetic data based on the personally identifiable information. (Pseudo-)Anonymization can also be achieved by removing some of the values before the third request is generated.

By the quarantine involving that the retrieved data is retrieved from the data storage, or the third request is transmittable to the external server, only as soon as or only after an association of at least a portion of the PII with the client device or its user expired or was permanently deleted, full anonymization of the PII can be achieved.

In this context, aspects of the disclosure have been described such that the personally identifiable information can be converted into the synthetic data. The converting into the synthetic data can include: replacing a first value of a first piece of the personally identifiable information by a synthesized value that is different from the first value; and including the synthetic data with the synthesized value into the first request 110 or the third request 130.

The replacing of the first value by the synthesized value can then include: removing the first value, such that the corresponding first 110 request or third request 130 does not include and is not associated with the removed first value for the first piece of personally identifiable information. The synthesized value can be obtained from a data object 900 that maps different values for the first piece of personally identifiable information to the synthesized value. An exemplary data object 900 is illustrated by FIG. 9.

In particular, aspects of the present disclosure may synthesize the user-agent, the IP-address and the session ID before transmitting them to the external server hosting the analytics software. How the IP address can be synthesized was described above, such as in context of FIG. 8 and the transformer 3, 4 or in context of the replacing of a portion of the IP address by one or more predetermined values.

A user-agent of the user's browser may be a description of the software setup the user visits a website with. The user-agent may be presented as part of the headers of the HTTP requests that hit the server 100 (all other headers of the HTTP request can be deleted at this stage). For example, a typical user-agent looks like this:

Mozilla/5.0 (Windows NT 10.0; Win64; x64) AppleWebKit/537.36 (KHTML, like Gecko) Chrome/97.0.4692.71 Safari/537.36

This specific user-agent contains the information that a user uses "Windows 10" as their operating system and "Google Chrome" as their browser. The versions of the operating systems and browser can be very detailed and vary in a space of up to ten digits (e.g., 97.0.4692.71). This leads to a high cardinality where only a handful of users might have the version 97.0.4692.71, which could result in an attribute that serves to identify personas. According to aspects of the present disclosure, the method includes identifying the user's browser and their operating system. Hence, the full granularity that the user-agent provides natively is not required and can therefore be modified from an analyzing perspective. However, some analytics software, such as Google Analytics, may not accept to set the browser/operating system directly. Therefore, a full synthetic user-agent may be sent to have browser/operating system reported accurately.

Typically for users of common software setups such as "Google Chrome"+"Windows", there may be dozens of users with the same user-agent. However, for less common software setups such as "Firefox"+"Linux", a user-agent that will not be unique cannot be guaranteed. Aspects of the present disclosure will therefore protect the user against identifying themselves through their potentially unique user-agent, by exchanging their actual user-agent against a generic and synthetic user-agent that still delivers the same generic properties such as browser name and operating system.

This can be achieved by aspects of the disclosure detecting the browser and the operating system from the user-agent in the system according to FIG. 8. As soon as these properties are known, they will be replaced by a universal user-agent that provides the same properties. For example, the overview of FIG. 9 shows how different user-agents that have the same browser/operating system properties will be replaced with a generic version of the user-agent with the same properties.

To create the list of synthetic user-agents, aspects of disclosure analyze the historic prevalence of original user-agents and only used those combinations (browser+operating system), that represented at least 250 different user entries per month. All combinations that are represented by less than 250 user entries per month can be discarded and replaced by an empty user-agent. This list will be reviewed on a yearly basis to ensure to have a representative and accurate methodology.

As described, the converting into the synthetic data can include: replacing a first value of a first piece of the personally identifiable information (e.g., a session ID) by a synthesized value that is different from the first value; and including the synthetic data with the synthesized value into the first request 110 or the third request 130. The synthesized value can be obtained by an operation that is applied to the first value, wherein the operation includes a one-way hashing function. The operations can further include supplementing the first value with another value before the one-way hashing function is applied to the supplemented first value. The other value can be an arbitrary value, preferably wherein the other value includes arbitrary text.

For example, a session ID is an identifier that can be used to group multiple hits into an interaction stream, which tells about the actions that happened on a platform (e.g., first the page was loaded, then a video was started all within the same visit). The ID itself can be stored in a cookie, directly on the browser of the device. In regular setups of analytics tools, the session ID is also used to distinguish multiple sessions from the same user when visiting the platform several times.

These distinguishing efforts, however, could potentially also identify a device through the cookie, which persists until being deleted or expired. This could result in a potential data security risk and a breach of legal regulations.

According to aspects of the present disclosure a unique session ID is set for each visit via a first-party cookie that will expire after 30 minutes of inactivity or after 3.5 hours of activity. The identifier, such as the cookie, may expire at 3.5 hours, but other expirations are possible, such as 10 hours. In other words, the cookie may automatically be deleted from the browser after the session has ended. To protect the ID itself from so-called cookie-syncing, where different tools can synchronize (first-party) cookie IDs and merge IDs across websites, the session ID value on the client will be replaced with a "salted hash". A hashing function is a one-way function that will always translate content A into content B. However, since it is a one-way function, it is impossible to derive content A if you were to know content B. However, if the hashing function is known, an attacker might be able to continuously guess the Session ID and validate it against the known hash value. While a so called "brute force" attack on guessing the IDs is impractical because of the large size of potential IDs, attackers with knowledge of all session IDs during a certain timeframe would have a significantly reduced set to choose from. Considering the fact, that there is only a handful of safe hashing functions, the value of session ID cookie can preferably not only be hashed, but also supplemented with an arbitrary piece of text before the actual hashing process. This makes it practically impossible to guess the hashed session ID, even if the value of the session ID cookie was known in addition to the hashing function, which creates a synthesizing effect.

In conclusion, described aspects of the present disclosure allow to de-personalize data from users and/or client devices before being sent to analytics systems such as Google Analytics. An identification of a user/or device is made increasingly unlikely or is even not possible. Aspects of the present disclosure provide methodologies to anonymize and synthesize data in a scalable environment, which is independent from the analytics system itself. In addition, preferred means were described to improve system availability, system latency and scalability.

The above-described aspects and embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a "computer", such as client 1, may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet 121. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the present disclosure may be embodied as a computer-readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "algorithm," "service," "program code," "computer program" or "software" are used herein in a generic sense to refer to any type of computer code or set of computer-executable instructions that can be employed to program a computer or other processor to implement various aspects of the present disclosure as discussed above. The data storage, receiver, subscriber, dispatcher, transformer, and synthesizer may be implemented by computer software and/or computer hardware. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the data record may be stored in computer-readable media in any suitable form. For simplicity of illustration, data records may be shown to have data record entries. However, any suitable mechanism may be used to establish locations within the data record to store data, such as parameter values.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user" or "player." It should be appreciated that a "user" or "player" need not be a single individual, and that in some embodiments, actions attributable to a "user" or "player" may be performed by a team of individuals and/or an individual in combination with computer-assisted tools or other mechanisms. It should be appreciated that a "user" or "player" need not be an individual and could be a machine, such as in form of a bot.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Further, though advantages of the present disclosure are indicated, it should be appreciated that not every embodiment of the disclosure described herein will include every described advantage. Some aspects and embodiments may not implement any features described as advantageous herein and in some instances one or more of the described features may be implemented to achieve further embodiments. Accordingly, this description and these drawings are by way of example only.

Having described several aspects of at least two embodiments of this disclosure, it is to be appreciated that various alterations, modifications, and improvements will readily occur to those skilled in the art. Such alterations, modifications, and improvements are intended to be part of this disclosure, and are intended to be within the scope of the disclosure as defined by the appended claims.

The present disclosure can (alternatively) be described by one or more of the following numbered aspects:

Aspects

1. A method for providing anonymized personally identifiable information, wherein the method is implemented by one or more first computers, the method comprising:
    obtaining a first request (110), the first request (110) including first data indicating actions that happened at a client device (1) and second data that is associated with the first data and that is based on personally identifiable information associated with the client device (1);
    quarantining at least the second data, wherein the quarantining at least includes storing at least the second data in a data storage (102);
    retrieving data from the data storage (102), wherein the retrieved data is based on the stored second data; and
    generating a third request (130) to be transmitted to a server (1000) external to the one or more first computers, wherein the third request (130) includes the first data and synthetic data associated with the first data, wherein the synthetic data is based on the retrieved data and was synthesized based on the personally identifiable information.

2. The method of aspect 1, wherein the retrieved data is retrieved from the data storage (102), or the third request (130) is transmittable to the external server (1000), only after a predetermined amount of time (T1, T2) expired since a time (TO) when some of the actions happened at the client device (1), preferably wherein the predetermined amount of time is in accordance with expiry or permanent deletion of an association of at least a portion of the personally identifiable information with the client device (1) or its user.

3. The method of aspect 1 or 2, wherein the retrieved data is retrieved from the data storage (102), or the third request (130) is transmittable to the external server (1000), only as soon as or only after an association of at least a portion of the personally identifiable information with the client device (1) or its user expired or was permanently deleted.

4. The method of aspect 1, 2 or 3, wherein the retrieved data is retrieved from the data storage (102), or the third request (130) is transmittable to the external server (1000), only as soon as or only after any or an identifier, such as a Cookie, associated with at least a portion of the personally identifiable information expired or was permanently deleted, such as on the client device (1), on the one or more first computers, or elsewhere outside these devices.

5. The method of aspect 3, wherein the association of the portion of the personally identifiable information with the client device (1) or its user expired or was permanently deleted by changing at the client device (1) a value of the portion of the personally identifiable information to a new value.

6. The method of any one of aspects 1 to 5, wherein the personally identifiable information or the identifier directly or indirectly identifies the client device (1) and/or a user of the client device (1) related with the personally identifiable information.

7. The method of any one of the preceding aspects, wherein the second data included in the obtained first request (110) and/or the data retrieved from the data storage (102) is the synthetic data that was synthesized based on the personally identifiable information associated with the client device (1).

8. The method of aspect 7, further comprising:
by one or more second computers,
receiving a second request (20, 120) directly or indirectly from the client device (1), wherein the second request (20, 120) includes the first data and the personally identifiable information, and
generating the first request (110) based on the second request (20, 120), wherein the generating of the first request (110) includes:
synthesizing the synthetic data including converting at least some of the personally identifiable information included in the second request (20, 120) into the synthetic data; and
including the synthetic data instead of the personally identifiable information into the first request (110).

9. The method of aspect 8, wherein the second request (20, 120) is a first tracking request generated on the client device (1) for tracking of the actions by a user at the client device (1).

10. The method of aspect 8 or 9, wherein the one or more second computers are among the one or more first computers, or wherein the one or more second computers are external to but communicatively coupled with the one or more first computers, such as a synthesizer server that is located upstream the one or more first computers.

11. The method of any one of aspects 1 to 6, wherein the second data included in the obtained first request (110) and/or the data retrieved from the data storage (102) is the personally identifiable information associated with the client device (1).

12. The method of aspect 11, wherein the generating of the third request (130) includes: synthesizing the synthetic data including converting at least some of the second data or retrieved data into the synthetic data; and including the synthetic data instead of the second data or retrieved data into the third request (130).

13. The method of any one of the preceding aspects, wherein the external server (1000) is configured to host a third party analytics tool software for analyzing actions that happened at the client device (1).

14. The method of any one of the preceding aspects, further comprising:
transmitting the generated third request (130) to the external server (1000), preferably wherein the third request (130) does not include the personally identifiable information.

15. The method of aspect 14, wherein the third request (130) is transmitted to the external server (1000) only after the predetermined amount of time (T1, T2) expired since some of the actions happened at the client device (1).

16. The method of aspect 14 or 15, wherein the third request (130) is transmitted to the external server (1000) only as soon as or only after the association of at least a portion of the personally identifiable information with the client device (1) or its user expired or was permanently deleted.

17. The method of any one of the preceding aspects, wherein the synthetic data includes an obfuscated, reduced, generalized and/or hashed version of the personally identifiable information.

18. The method of any one of the preceding aspects, wherein the first request (110) or the third request (130) is a second tracking request generated with obfuscated, reduced, generalized and/or hashed versions of the personally identifiable information for evaluating the actions by a user at the client device (1).

19. The method of any one of aspects 8 to 18, wherein the converting into the synthetic data includes:
replacing a first value of a first piece of the personally identifiable information by a synthesized value that is different from the first value; and
including the synthetic data with the synthesized value into the first request (110) or the third request (130).

20. The method of aspect 19, wherein the replacing of the first value by the synthesized value includes:
removing the first value, such that the corresponding first request (110) or third request (130) does not include and is not associated with the removed first value for the first piece of personally identifiable information.

21. The method of aspect 19 or 20, wherein the synthesized value is obtained from a data object (900) that maps different values for the first piece of personally identifiable information to the synthesized value.

22. The method of any one of aspects 19 to 21, wherein the first value is contained in a header associated with the first request (110) or the second request (20, 120), and/or wherein the synthesized value is an attribute of or is contained in a header associated with the first, second or third request (20, 110, 120, 130).

23. The method of any one of the preceding aspects, wherein the personally identifiable information includes a session identifier associated with a user of the client device (1), a portion of an IP address of the client device (1), a user-agent of a browser used by a user at the client device (1), a contact address associated with a user of the client device (1), and/or a name associated with a user of the client device (1).

24. The method of any one of aspects 19 to 23, wherein the first piece of personally identifiable information is an IP address of the client device (1) and wherein the synthesized value is based on the IP address and is indicative of a geographic region, such as a country, associated with the client device (1), preferably wherein the synthesized value indicative of the geographic region is generated by one or more of the first computers or by one or more of the second computers, preferably wherein the synthesized value is further based on a stored association between ranges for IP addresses and respective corresponding geographic regions.

25. The method of any one of aspects 19 to 23, wherein the first piece of personally identifiable information is a subset of an IP address of the client device (1) and wherein the synthesized value includes one or more predetermined values preferably obfuscating, reducing, generalizing and/or hashing the first value, preferably wherein the remaining subset of the IP address whose one or more values are not being replaced by a synthesized value is indicative of a geographic region, such as a country, associated with the client device (1).

26. The method of any one of aspects 19 to 25, wherein the synthesized value is obtained by an operation that is applied to the first value, wherein the operation includes a one-way hashing function.

27. The method of aspect 26, wherein the operations further include supplementing the first value with another value before the one-way hashing function is applied to the supplemented first value.

28. The method of aspect 27, wherein the other value is an arbitrary value, preferably wherein the other value includes arbitrary text.

29. The method of any one of the preceding aspects, wherein the retrieved data has not been retrievable from the data storage (102) during the quarantine until the retrieved data was made available for the retrieval from the data storage (102), or wherein the third request is not transmittable to the external server (1000) during the quarantine until the third request is made available for transmission to the external server (1000).

30. The method of any one of the preceding aspects, wherein quarantining at least the second data includes storing the second data associated with a key in the data storage (102) hosted or accessible by the one or more first computers, preferably wherein the key is identical to or is associated with the personally identifiable information associated with the second data.

31. The method of any one of the preceding aspects, wherein the quarantining of at least the second data further includes quarantining the first data.

32. The method of aspect 31, wherein quarantining the first and second data includes storing the second data and the first data, both associated with the key, in the data storage (102) hosted or accessible by the one or more first computers.

33. The method of any one of aspects 3 to 32, further comprising:
receiving, by one or more subscriber services (105) hosted on one or more of the first computers, a notification that the association of the personally identifiable information with the client device (1) or its user, such as the identifier associated with the personally identifiable information, is expired or permanently deleted.

34. The method of aspect 33, further comprising:
publishing, by the subscriber services (105), information about the expired or permanently deleted association or identifier to a queue (106) hosted on one or more of the first computers.

35. The method of aspect 34, wherein the one or more subscriber services (105) are multiple subscriber services (105) that are executed in parallel to process and dispatch to the queue (106) the information about the expired or permanently deleted association or identifier.

36. The method of any one of the preceding aspects, wherein the transmitting of the third request (130) to the external server (1000) is performed by a dispatcher (107) hosted on one or more of the first computers.

37. The method of aspect 36 the method further comprising:
pulling, by the dispatcher (107) and from the queue (106), the information about the expired or permanently deleted association or identifier; and
retrieving, from the data storage (102) and based on the pulled information, the second data, and preferably also the first data, for the generating of the third request (130).

38. The method of any one of aspects 14 to 37, wherein the third request (130) is transmitted to the external server (1000) before expiry of a time limit (T3) for accepting requests as given by the third party analytics software hosted on the external server (1000).

39. The method of any one of aspects 2 to 38, wherein the first data is associated with a time stamp and wherein the one or more first computers have access to a clock to determine the expiry of the predetermined amount of time.

40. The method of any one of aspects 2 to 39, wherein the second data is stored in the data storage (102) in association with a timestamp that is associated with the actions that happened at the client device (1), wherein a time at which the association or the identifier expired or was permanently deleted is determined based on the time stamp.

41. The method of aspect 40, wherein the timestamp indicates a time (T0) when the association of the at least a portion of the personally identifiable information with the client device (1), such as the identifier, started and wherein the one or more first computers have access to a clock such that the time at which the association or the identifier expires or is permanently deleted is further determined based on a read-out of the clock.

42. The method of any one of the preceding aspects, wherein the quarantining further includes retrieving of the second data or retrieved data and/or the synthesizing of the synthetic data.

43. The method of any one of the preceding aspects, wherein the second data is or includes the personally identifiable information or is the synthetic data that was synthesized based on the personally identifiable information, and/or wherein the data retrieved from the data storage is the stored second data or is the synthetic data that was synthesized based on the personally identifiable information of the stored second data, and/or wherein the synthetic data included in the third request is the data retrieved from the data storage or is synthetic data that was synthesized based on personally identifiable information of the retrieved data.

44. At least one non-transitory computer-readable storage medium storing computer-executable instructions that, when executed by one or more computers, cause the one or more computers to perform the method of any one of the preceding aspects.

45. A computing system, comprising:
at least one computer hardware processor; and
at least one non-transitory computer-readable storage medium storing processor-executable instructions that, when executed by the at least one computer hardware processor, cause the at least one computer hardware processor to perform the method of any one of aspects 1 to 43.

The various aspects and embodiments described above can be combined to provide yet further embodiments. These and other changes can be made to the embodiments in light of the above-detailed description. In general, in the following claims, the terms used should not be construed to limit the claims to the specific aspects and embodiments disclosed in the specification and the claims, but should be construed to include all possible embodiments along with the full scope of equivalents to which such claims are entitled.

The invention claimed is:

1. A method for providing anonymized personally identifiable information, wherein the method is implemented by one or more first computers, the method comprising:
obtaining a first request, the first request including first data indicating actions that happened at a client device and second data that is associated with the first data and that is based on personally identifiable information associated with the client device;
quarantining at least the second data, wherein the quarantining at least includes storing at least the second data in a data storage;

retrieving data from the data storage, wherein the retrieved data is based on the stored second data; and generating a third request to be transmitted to a server external to the one or more first computers, wherein the third request includes the first data and synthetic data associated with the first data, wherein the synthetic data is based on the retrieved data and was synthesized based on the personally identifiable information.

2. The method of claim 1, wherein the retrieved data is retrieved from the data storage, or the third request is transmittable to the external server, only after a predetermined amount of time expired since a time when some of the actions happened at the client device, preferably wherein the predetermined amount of time is in accordance with expiry or permanent deletion of an association of at least a portion of the personally identifiable information with the client device or its user.

3. The method of claim 1, wherein the retrieved data is retrieved from the data storage, or the third request is transmittable to the external server, only as soon as or only after an association of at least a portion of the personally identifiable information with the client device or its user expired or was permanently deleted.

4. The method of claim 1, wherein the retrieved data is retrieved from the data storage, or the third request is transmittable to the external server, only as soon as or only after any or an identifier, such as a Cookie, associated with at least a portion of the personally identifiable information expired or was permanently deleted on the client device or on the one or more first computers.

5. The method of claim 1, wherein the second data included in the obtained first request and/or the data retrieved from the data storage is the synthetic data that was synthesized based on the personally identifiable information associated with the client device.

6. The method of claim 5, further comprising:
by one or more second computers,
receiving a second request directly or indirectly from the client device, wherein the second request includes the first data and the personally identifiable information, and
generating the first request based on the second request, wherein the generating of the first request includes:
synthesizing the synthetic data including converting at least some of the personally identifiable information included in the second request into the synthetic data; and
including the synthetic data instead of the personally identifiable information into the first request.

7. The method of claim 1, wherein the second data included in the obtained first request and/or the data retrieved from the data storage is the personally identifiable information associated with the client device.

8. The method of claim 7, wherein the generating of the third request includes:
synthesizing the synthetic data including converting at least some of the second data or retrieved data into the synthetic data; and
including the synthetic data instead of the second data or retrieved data into the third request.

9. The method of claim 1, wherein the external server is configured to host a third party analytics tool software for analyzing actions that happened at the client device.

10. The method of claim 1, further comprising:
transmitting the generated third request to the external server, preferably wherein the third request does not include the personally identifiable information.

11. The method of claim 10, wherein the third request is transmitted to the external server only after the predetermined amount of time expired since some of the actions happened at the client device.

12. The method of claim 10, wherein the third request is transmitted to the external server only as soon as or only after the association of at least a portion of the personally identifiable information with the client device or its user expired or was permanently deleted.

13. The method of claim 1, wherein the synthetic data includes an obfuscated, reduced, generalized and/or hashed version of the personally identifiable information.

14. The method of claim 6 or 8, wherein the converting into the synthetic data includes:
replacing a first value of a first piece of the personally identifiable information by a synthesized value that is different from the first value; and
including the synthetic data with the synthesized value into the first request or the third request.

15. The method of claim 14, wherein the replacing of the first value by the synthesized value includes:
removing the first value, such that the corresponding first request or third request does not include and is not associated with the removed first value for the first piece of personally identifiable information.

16. The method of claim 14, wherein the synthesized value is obtained from a data object that maps different values for the first piece of personally identifiable information to the synthesized value.

17. The method of claim 14, wherein the first value is contained in a header associated with the first request or the second request, and/or wherein the synthesized value is an attribute of or is contained in a header associated with the first, second or third request.

18. The method of claim 14, wherein the synthesized value is obtained by an operation that is applied to the first value, wherein the operation includes a one-way hashing function.

19. The method of claim 1, wherein the retrieved data has not been retrievable from the data storage during the quarantine until the retrieved data was made available for the retrieval from the data storage, or wherein the third request is not transmittable to the external server during the quarantine until the third request is made available for transmission to the external server.

20. The method of claim 10, wherein the third request is transmitted to the external server before expiry of a time limit for accepting requests as given by the third party analytics software hosted on the external server.

21. The method of claim 1, wherein the quarantining further includes retrieving of the second data or retrieved data and/or the synthesizing of the synthetic data.

22. At least one non-transitory computer-readable storage medium storing computer-executable instructions that, when executed by one or more computers, cause the one or more computers to perform a method for providing anonymized personally identifiable information,
the method comprising:
obtaining a first request, the first request including first data indicating actions that happened at a client device and second data that is associated with the first data and that is based on personally identifiable information associated with the client device;
quarantining at least the second data, wherein the quarantining at least includes storing at least the second data in a data storage;

retrieving data from the data storage, wherein the retrieved data is based on the stored second data; and generating a third request to be transmitted to a server external to the one or more first computers, wherein the third request includes the first data and synthetic data associated with the first data, wherein the synthetic data is based on the retrieved data and was synthesized based on the personally identifiable information.

23. A computing system, comprising:

at least one computer hardware processor; and at least one non-transitory computer-readable storage medium storing processor-executable instructions that, when executed by the at least one computer hardware processor, cause the at least one computer hardware processor to perform a method for providing anonymized personally identifiable information, the method comprising:

obtaining a first request, the first request including first data indicating actions that happened at a client device and second data that is associated with the first data and that is based on personally identifiable information associated with the client device;

quarantining at least the second data, wherein the quarantining at least includes storing at least the second data in a data storage;

retrieving data from the data storage, wherein the retrieved data is based on the stored second data; and generating a third request to be transmitted to a server external to the one or more first computers, wherein the third request includes the first data and synthetic data associated with the first data, wherein the synthetic data is based on the retrieved data and was synthesized based on the personally identifiable information.

* * * * *